US012804169B2

(12) United States Patent
Chiu et al.

(10) Patent No.: US 12,804,169 B2
(45) Date of Patent: Nov. 17, 2026

(54) CANDIDATE REORDERING AND MOTION VECTOR REFINEMENT FOR GEOMETRIC PARTITIONING MODE

(71) Applicant: MEDIATEK INC., Hsinchu City (TW)

(72) Inventors: Chih-Yao Chiu, Hsinchu City (TW); Chih-Hsuan Lo, Hsinchu City (TW); Chun-Chia Chen, Hsinchu City (TW); Chih-Wei Hsu, Hsinchu City (TW); Ching-Yeh Chen, Hsinchu City (TW); Tzu-Der Chuang, Hsinchu City (TW)

(73) Assignee: MEDIATEK INC., Hsinchu City (TW)

( * ) Notice: Subject to any disclaimer, the term of this patent is extended or adjusted under 35 U.S.C. 154(b) by 0 days.

(21) Appl. No.: 18/684,236

(22) PCT Filed: Aug. 15, 2022

(86) PCT No.: PCT/CN2022/112566
§ 371 (c)(1),
(2) Date: Feb. 16, 2024

(87) PCT Pub. No.: WO2023/020446
PCT Pub. Date: Feb. 23, 2023

(65) Prior Publication Data

US 2025/0150600 A1 May 8, 2025

Related U.S. Application Data

(60) Provisional application No. 63/318,806, filed on Mar. 11, 2022, provisional application No. 63/233,346, filed on Aug. 16, 2021.

(51) Int. Cl.
*H04N 19/176* (2014.01)
*G06V 10/75* (2022.01)
(Continued)

(52) U.S. Cl.
CPC ......... *H04N 19/176* (2014.11); *G06V 10/751* (2022.01); *H04N 19/119* (2014.11);
(Continued)

(58) Field of Classification Search
CPC .. H04N 19/176; H04N 19/119; H04N 19/139; H04N 19/159; H04N 19/513; G06V 10/751
See application file for complete search history.

(56) References Cited

U.S. PATENT DOCUMENTS 10,701,390 B2 6/2020 Li et al.
10,701,393 B2 6/2020 Chen
(Continued)

FOREIGN PATENT DOCUMENTS

CN 103891283 A 6/2014
CN 110383839 A 10/2019
(Continued)

OTHER PUBLICATIONS

International Search Report and Written Opinion dated Nov. 15, 2022, issued in application No. PCT/CN2022/112566.
(Continued)

*Primary Examiner* — Md N Haque
(74) *Attorney, Agent, or Firm* — McClure, Qualey & Rodack, LLP

(57) ABSTRACT

A method that reorders partitioning candidates or motion vectors based on template matching costs for geometric prediction mode (GPM) is provided. A video coder receives data to be encoded or decoded as a current block of a current picture of a video. The current block is partitioned into first and second partitions by a bisecting line defined by an angle-distance pair. The video coder identifies a list of candidate prediction modes for coding the first and second partitions. The video coder computes a template matching
(Continued)

(TM) cost for each candidate prediction mode in the list. The video coder receives or signals a selection of a candidate prediction mode based on an index that is assigned to the selected candidate prediction mode based on the computed TM costs. The video coder reconstructs the current block by using the selected candidate prediction mode to predict the first and second partitions.

13 Claims, 13 Drawing Sheets

(51) Int. Cl.
*H04N 19/119* (2014.01)
*H04N 19/139* (2014.01)
*H04N 19/159* (2014.01)
*H04N 19/513* (2014.01)
(52) U.S. Cl.
CPC ......... *H04N 19/139* (2014.11); *H04N 19/159* (2014.11); *H04N 19/513* (2014.11)

(56) References Cited

U.S. PATENT DOCUMENTS

| | | | | |
|---|---|---|---|---|
| 10,869,043 | B2 | 12/2020 | Xu et al. | |
| 10,917,636 | B2 | 2/2021 | Li et al. | |
| 11,159,788 | B2 | 10/2021 | Chen et al. | |
| 11,570,461 | B2 | 1/2023 | Jeong et al. | |
| 11,616,945 | B2 | 3/2023 | Zhang et al. | |
| 11,627,326 | B2 | 4/2023 | Park et al. | |
| 11,856,240 | B1 | 12/2023 | Kirchhoffer et al. | |
| 11,876,964 | B2 | 1/2024 | De Luxan Hernandez et al. | |
| 2009/0232215 | A1* | 9/2009 | Park | H04N 19/70 375/E7.125 |
| 2011/0002388 | A1* | 1/2011 | Karczewicz | H04N 19/573 375/E7.125 |
| 2012/0281752 | A1* | 11/2012 | Zheng | H04N 19/122 375/240.03 |
| 2017/0339404 | A1* | 11/2017 | Panusopone | H04N 19/105 |
| 2017/0353730 | A1* | 12/2017 | Liu | H04N 19/159 |
| 2018/0241993 | A1 | 8/2018 | Panusopone et al. | |
| 2018/0376160 | A1 | 12/2018 | Zhang et al. | |
| 2019/0281285 | A1 | 9/2019 | Piao et al. | |
| 2020/0068218 | A1* | 2/2020 | Chen | H04N 19/82 |
| 2020/0244968 | A1 | 7/2020 | Jun | |
| 2020/0374513 | A1* | 11/2020 | Xiu | H04N 19/64 |
| 2020/0396476 | A1 | 12/2020 | Furht | |
| 2020/0404289 | A1 | 12/2020 | Li et al. | |
| 2021/0014522 | A1* | 1/2021 | Jung | H04N 19/593 |
| 2021/0037238 | A1* | 2/2021 | Park | H04N 19/105 |
| 2021/0037256 | A1 | 2/2021 | Zhang et al. | |
| 2021/0044821 | A1 | 2/2021 | Galpin et al. | |
| 2021/0120262 | A1 | 4/2021 | Chen et al. | |
| 2021/0185347 | A1 | 6/2021 | Liu et al. | |
| 2021/0195245 | A1 | 6/2021 | Li et al. | |
| 2021/0250580 | A1 | 8/2021 | Chen et al. | |
| 2022/0150507 | A1 | 5/2022 | Lin | |
| 2022/0329822 | A1* | 10/2022 | Chang | H04N 19/46 |
| 2024/0267533 | A1* | 8/2024 | Zhang | H04N 19/154 |

FOREIGN PATENT DOCUMENTS

| | | | |
|---|---|---|---|
| CN | 110708541 | A | 1/2020 |
| CN | 110876063 | A | 3/2020 |
| CN | 110933423 | A | 3/2020 |
| CN | 110944170 | A | 3/2020 |
| CN | 112313952 | A | 2/2021 |
| CN | 112385228 | A | 2/2021 |
| EP | 3 443 746 | A1 | 2/2019 |
| TW | 202007158 | A | 2/2020 |
| TW | 202011355 | A | 3/2020 |
| WO | 2017/201141 | A1 | 11/2017 |
| WO | 2020/049447 | A1 | 3/2020 |
| WO | 2020/076097 | A1 | 4/2020 |
| WO | 2020/084460 | A1 | 4/2020 |
| WO | 2020182216 | A1 | 9/2020 |

OTHER PUBLICATIONS

Chinese language office action dated Jan. 31, 2023, issued in application No. TW 111130760.
International Search Report and Written Opinion dated Nov. 10, 2022, issued in application No. PCT/CN2022/112154.
Chinese language office action dated May 4, 2023, issued in application No. TW 111130543.
Chinese language office action dated Nov. 22, 2023, issued in application No. TW 111130543.
Lie, W.N., et al.; "Video Error Concealment by Integrating Greedy Suboptimization and Kalman Filtering Techniques;" IEEE Transactions on Circuits and Systems for Video Technology; vol. 16; No. 8; Aug. 2006; pp. 1-11.
International Search Report and Written Opinion dated Nov. 15, 2022, issued in application No. PCT/CN2022/112551.
Chinese language office action dated May 12, 2023, issued in application No. TW 111130761.
Extended European Search Report dated Jun. 3, 2025, issued in application No. EP 22857756.5.
An, J., et al.; "Enhanced Merge Mode based on JEM7.0;" Joint Video Experts Team (JVET) of ITU-T SG 16 WP 3 and ISO/IEC JTC 1/SC 29/WG 11; Apr. 2018; pp. 1-14.
Chen, H., et al.; "Description of SDR, HDR and 360° video coding technology proposal by Huawei, GoPro, HiSilicon, and Samsung—general application scenario;" Joint Video Experts Team (JVET) of ITU-T SG 16 WP 3 and ISO/IEC JTC 1/SC 29/WG 11; Apr. 2018; pp. 1-132.
Esenlik, S., et al.; "Description of Core Experiment 9 (CE9): Decoder Side Motion Vector Derivation;" Joint Video Exploration Team (JVET) of ITU-T SG 16 WP 3 and ISO/IEC JTC 1/SC 29/WG 11; Apr. 2018; pp. 1-34.

* cited by examiner

1005

| Candidate Index | MV | TM Cost | Reordered Index |
|---|---|---|---|
| 0 | MV0 | 30 | 1 |
| 1 | MV1 | 45 | 2 |
| 2 | MV2 | 20 | 0 |
| 3 | MV3 | 80 | - |
| 4 | MV4 | 60 | 4 |
| 5 | MV5 | 55 | 3 |

| Candidate Split Mode (angle-distance) | TM Cost | Reordered Index |
|---|---|---|
| 1101 | 70 | 2 |
| 1102 | 45 | 1 |
| 1103 | 100 | - |
| 1104 | 30 | 0 |
| 1105 | 85 | - |
| 1106 | 90 | - |

CANDIDATE REORDERING AND MOTION VECTOR REFINEMENT FOR GEOMETRIC PARTITIONING MODE

CROSS REFERENCE TO RELATED PATENT APPLICATION(S)

The present disclosure is part of a non-provisional application that claims the priority benefit of U.S. Provisional Patent Application No. 63/233,346, filed on 16 Aug. 2021, and of U.S. Provisional Patent Application No. 63/318,806, filed on 11 Mar. 2022. Content of above-listed applications are herein incorporated by reference.

TECHNICAL FIELD

The present disclosure relates generally to video coding. In particular, the present disclosure relates to methods of prediction candidate selection for geometric prediction mode (GPM).

BACKGROUND

Unless otherwise indicated herein, approaches described in this section are not prior art to the claims listed below and are not admitted as prior art by inclusion in this section.

High-Efficiency Video Coding (HEVC) is an international video coding standard developed by the Joint Collaborative Team on Video Coding (JCT-VC). HEVC is based on the hybrid block-based motion-compensated DCT-like transform coding architecture. The basic unit for compression, termed coding unit (CU), is a 2N×2N square block of pixels, and each CU can be recursively split into four smaller CUs until the predefined minimum size is reached. Each CU contains one or multiple prediction units (PUs).

To increase the coding efficiency of motion vector (MV) coding in HEVC, HEVC has the Skip, and Merge mode. Skip and Merge modes obtain the motion information from spatially neighboring blocks (spatial candidates) or a temporal co-located block (temporal candidate). When a PU is Skip or Merge mode, no motion information is coded, instead, only the index of the selected candidate is coded. For Skip mode, the residual signal is forced to be zero and not coded. In HEVC, if a particular block is encoded as Skip or Merge, a candidate index is signaled to indicate which candidate among the candidate set is used for merging. Each merged prediction unit (PU) reuses the MV, prediction direction, and reference picture index of the selected candidate.

SUMMARY

The following summary is illustrative only and is not intended to be limiting in any way. That is, the following summary is provided to introduce concepts, highlights, benefits and advantages of the novel and non-obvious techniques described herein. Select and not all implementations are further described below in the detailed description. Thus, the following summary is not intended to identify essential features of the claimed subject matter, nor is it intended for use in determining the scope of the claimed subject matter.

Some embodiments of the disclosure provide a method that reorders partitioning candidates or motion vectors based on template matching costs for geometric prediction mode (GPM). A video coder receives data to be encoded or decoded as a current block of a current picture of a video. The current block is partitioned into first and second partitions by a bisecting line defined by an angle-distance pair. The video coder identifies a list of candidate prediction modes for coding the first and second partitions. The video coder computes a template matching (TM) cost for each candidate prediction mode in the list. The video coder receives or signals a selection of a candidate prediction mode based on an index that is assigned to the selected candidate prediction mode based on the computed TM costs. The video coder reconstructs the current block by using the selected candidate prediction mode to predict the first and second partitions.

The first partition may be coded by inter-prediction that references samples in a reference picture and the second partition may be coded by intra-prediction that references neighboring samples of the current block in the current picture. Alternatively, the first and second partitions may both be coded by inter-prediction that use first and second motion vectors from the list to reference samples in first and second reference pictures.

The different candidate prediction modes in the list may correspond to different bisecting lines that are defined by different angle-distances pairings. The different candidate prediction modes in the list may also correspond to different motion vectors that may be selected to generate an inter-prediction for reconstructing the first partition or the second partition of the current block. In some embodiments, the list of candidate prediction modes includes only uni-prediction candidates and no bi-prediction candidates when the current block is greater than a threshold size, and merge candidates when the current block is less than a threshold size.

In some embodiments, the video encoder reconstructs the current block by using refined motion vectors to generate predictions for the first and second partitions. A refined motion vector is identified by searching for a motion vector having a lowest TM cost based on an initial motion vector. In some embodiments, the search for the motion vector having the lowest TM cost includes iteratively applying a search pattern centered at a motion vector identified as having a lowest TM cost from a previous iteration (until a lower cost can no longer be found). In some embodiments, the encoder applies different search patterns at different resolutions (e.g., 1-pel, ½-pel, ¼-pel, etc.) in different iterations or rounds during the search process for refining the motion vector.

BRIEF DESCRIPTION OF THE DRAWINGS

The accompanying drawings are included to provide a further understanding of the present disclosure, and are incorporated in and constitute a part of the present disclosure. The drawings illustrate implementations of the present disclosure and, together with the description, serve to explain the principles of the present disclosure. It is appreciable that the drawings are not necessarily in scale as some components may be shown to be out of proportion than the size in actual implementation in order to clearly illustrate the concept of the present disclosure.

DETAILED DESCRIPTION

In the following detailed description, numerous specific details are set forth by way of examples in order to provide a thorough understanding of the relevant teachings. Any variations, derivatives and/or extensions based on teachings described herein are within the protective scope of the present disclosure. In some instances, well-known methods, procedures, components, and/or circuitry pertaining to one or more example implementations disclosed herein may be described at a relatively high level without detail, in order to avoid unnecessarily obscuring aspects of teachings of the present disclosure.

I. Candidate Reordering for Merge Mode

Figure 1:
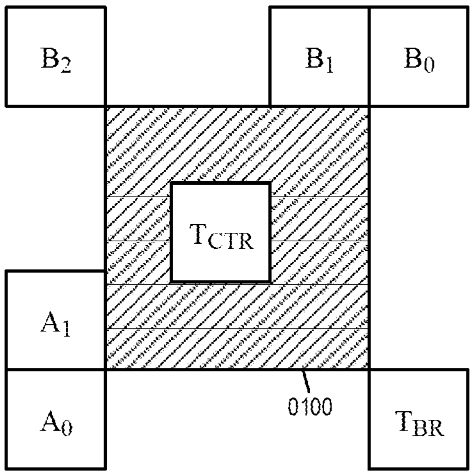
FIG. 01 illustrates the motion candidates of merge mode.

FIG. 01 illustrates the motion candidates of merge mode. The figure shows a current block 0100 of a video picture or frame being encoded or decoded by a video codec. As illustrated, up to four spatial MV candidates are derived from spatial neighbors A0, A1, B0 and B1, and one temporal MV candidate is derived from TBR or TCTR (TBR is used first, if TBR is not available, TCTR is used instead). If any of the four spatial MV candidates is not available, the position B2 is then used to derive MV candidate as a replacement. After the derivation process of the four spatial MV candidates and one temporal MV candidate, removing redundancy (pruning) is applied in some embodiments to remove redundant MV candidates. If after removing redundancy (pruning), the number of available MV candidates is smaller than five, three types of additional candidates are derived and are added to the candidate set (candidate list). A video encoder selects one final candidate within the candidate set for Skip, or Merge modes based on the rate-distortion optimization (RDO) decision, and transmits the index to a video decoder. (Skip mode and merge mode are collectively referred to as "merge mode" in this document.)

For some embodiments, merge candidates are defined as the candidates of a general "prediction+merge" algorithm framework. The "prediction+merge algorithm framework has a first part and a second part. The first part generating a candidate list (a set) of predictors that are derived by inheriting neighboring information or refining or processing neighboring information. The second part is sending (i) a merge index to indicate which inheriting neighbor in the candidate list is selected and (ii) some side information related to the merge index. In other words, the encoder signals the merge index and some side information for the selected candidate to the decoder.

Figure 2:
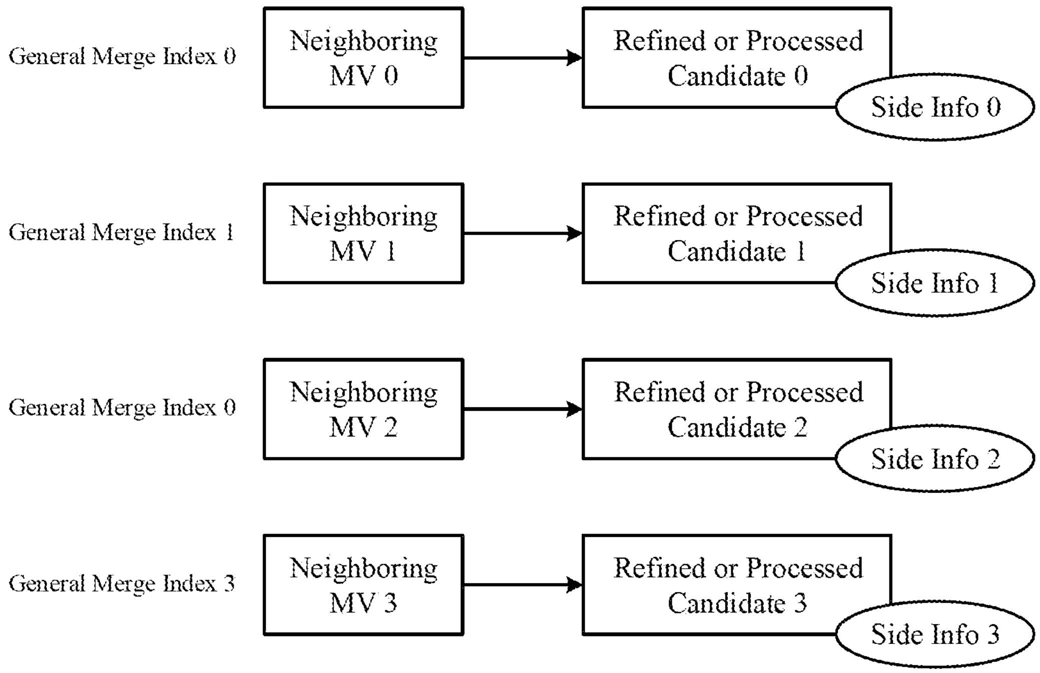
FIG. 02 conceptually illustrates a "prediction+merge" algorithm framework for merge candidates.

FIG. 02 conceptually illustrates the "prediction+merge" algorithm framework for merge candidates. The candidate list includes many candidates that inherit neighboring information. The inherited information is then processed or refined to form new candidates. During the processes, some side information for the candidates is generated and sent to decoder.

Video coders (encoders or decoders) may process merge candidates in different ways. Firstly, in some embodiments, a video coder may combine two or more candidates into one candidate. Secondly, in some embodiments, a video coder may use the original candidate to be original MV predictor and perform motion estimation searching using current block pixels to find a final MVD (Motion Vector Difference), where the side information is the MVD. Thirdly, in some embodiments, a video coder may use the original candidate to be the original MV predictor and perform motion estimation searching using current block pixels to find a final MVD for L0, and, for L1 predictor, and the L1 predictor is the original candidate. Fourthly, in some embodiments, a video coder may use the original candidate to be original MV predictor and perform motion estimation searching using current block pixels to find a final MVD for L1, and L0 predictor is the original candidate. Fifthly, in some embodiments, a video coder may use the original candidate to be original MV predictor and do MV refinement searching using top or left neighboring pixels as searching template to find a final predictor. Sixthly, a video coder may use the original candidate to be original MV predictor and perform MV refinement searching using bi-lateral template (pixels on L0 and L1 reference pictures pointed by candidate MV or mirrored MV) as searching template to find a final predictor.

Template matching (TM) is a video coding method to refine a prediction of the current CU by matching a template (current template) of the current CU in the current picture and a reference template in a reference picture for the prediction. A template of a CU or block generally refers to a specific set of pixels neighboring the top and/or the left of the CU.

For this document, the term "merge candidate" or "candidate" means the candidate in the general "prediction+merge" algorithm framework. The "prediction+merge" algorithm framework is not restricted to the previous described embodiments. Any algorithm having "prediction+merge index" behavior all belongs to this framework.

In some embodiments, a video coder reorders the merge candidates, i.e., the video coder modifies the candidate order inside the candidate list to achieve better coding efficiency. The reorder rule depends on some pre-calculation for the current candidates (merge candidates before the reordering), such as upper neighbor condition (modes, MVs and so on)

or left neighbor condition (modes, MVs and so on) of the current CU, the current CU shape, or up/left L-shape template matching.

Figure 3:
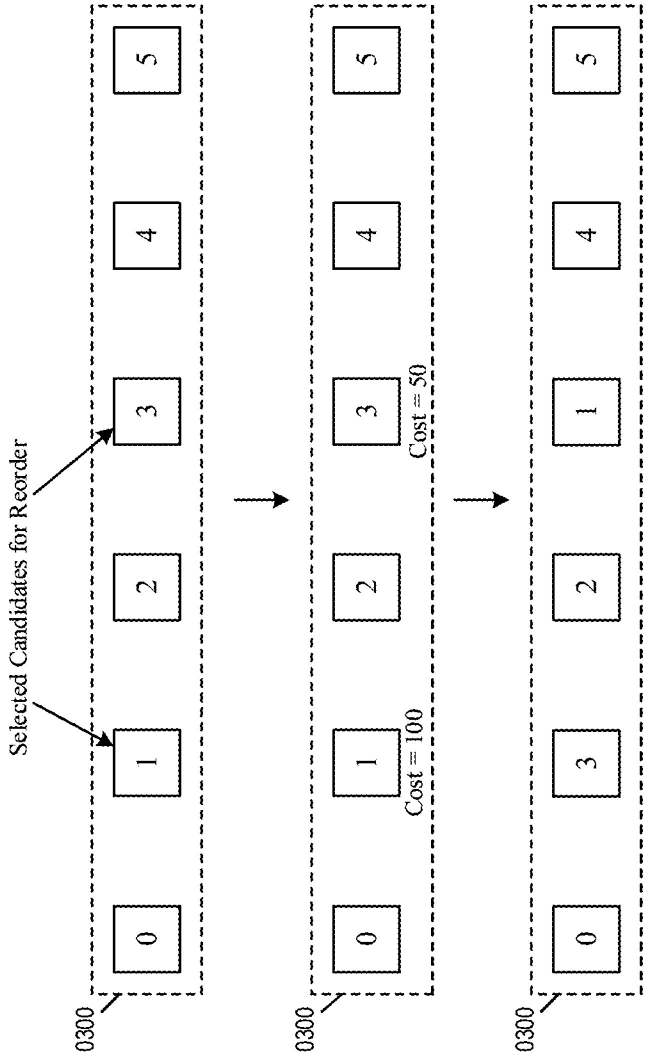
FIG. 03 conceptually illustrates an example candidate reordering.

FIG. 03 conceptually illustrates an example candidate reordering. As illustrated, an example merge candidate list 0300 has six candidates labeled '0' through '5'. The video coder initially selects some candidates (candidates labeled '1' and '3') for reordering. The video coder then pre-calculates the cost of those candidates (100 and 50 for candidates labeled '1' and '3' respectively). The cost is named as the guess-cost of the candidate, the lower the cost means the better the candidate. Finally, the video coder reorders the selected candidates by moving lower cost candidates (the candidate labeled '3') to the front of the list.

In general, for a merge candidate Ci having an order position Oi in the merge candidate list (with i=0~N−1, N is total number of candidates in the list, Oi=0 means Ci is at the beginning of the list and Oi=N−1 means Ci is at the end of the list), with Oi=i (C0 order is 0, C1 order is 1, C2 order is 2, . . . and so on), the video coder reorders merge candidates in the list by changing the Oi for Ci for selected values of i (changing the order of some selected candidates).

In some embodiments, Merge Candidate Reordering can be turned off according to the size or shape of the current PU. The video coder may pre-define several PU sizes or shapes for turning-off Merge Candidate Reordering. In some embodiments, other conditions are involved for turning off the Merge Candidate Reordering, such as picture size, QP value, and so on, being certain predefined values. In some embodiments, the video coder may signal a flag to switch on or off Merge Candidate Reordering. For example, a flag (e.g. "merge_cand_rdr_en") may be signaled to indicate whether "Merge Candidate Reorder" is enabled (value 1: enabled, value 0: disabled). When not present, the value of merge_cand_rdr_en is inferred to be 1. The minimum sizes of units in the signaling, merge_cand_rdr_en, can also be separately coded in sequence level, picture level, slice level, or PU level.

Generally, a video coder performing candidate reordering by (1) identifying one or more candidates for reordering, (2) calculating a guess-cost for each identified candidate, and (3) reordering the candidates according to the guess-costs of the selected candidates. In some embodiments, the calculated guess-costs of some of the candidates are adjusted (cost adjustment) before the candidates are reordered.

In some embodiments, the step of selecting one or more candidates can be performed by several different methods. In some embodiments, the video coder selects all candidates with merge_index≤threshold. The threshold is a pre-defined value, and the merge_index is the original order inside the merge list (merge_index is 0, 1, 2, . . . ). For example, if the original order of the current candidate is at the beginning of the merge list, the merge_index=0 (for the current candidate).

In some embodiments, the video coder selects candidates for reordering according to the candidate type. The candidate type is the candidate category of all candidates. The video coder firstly categorizes all candidates into MG types, (MG=1 or 2 or 3 or other value), then, it selects MG_S (MG_S=1, 2, 3 . . . , MG_S≤MG) types from all MG types for reordering. An example of categorization is to categorize all candidates into 4 candidate types. Type 1 is a candidate of spatial neighboring MV. Type 2 is a candidate of temporal neighboring MV. Type 3 is all sub-PU candidate (such as Sub-PU TMVP, STMVP, Affine merge candidate). Type 4 is all other candidates. In some embodiments, the video coder selects a candidate according to both merge_index and candidate type.

In some embodiments, a L-shape matching method is used for calculating the guess-costs of selected candidates. For the currently selected merge candidate, the video coder retrieves a L-shape template of current picture and a L-shape template of reference picture and compares the difference between the two templates. The L-shape matching method has two parts or steps: (i) identifying the L-shape templates and (ii) matching the derived templates.

Figure 4:
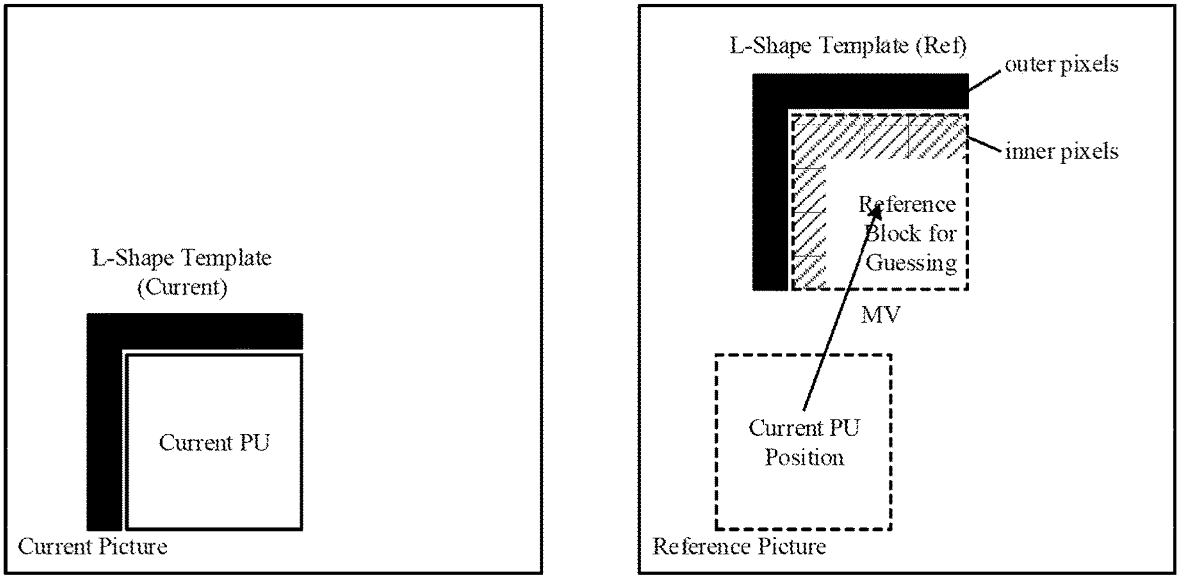
FIGS. 04-05 conceptually illustrate the L-shape matching method for calculating the guess-costs of selected candidates.
Figure 5:
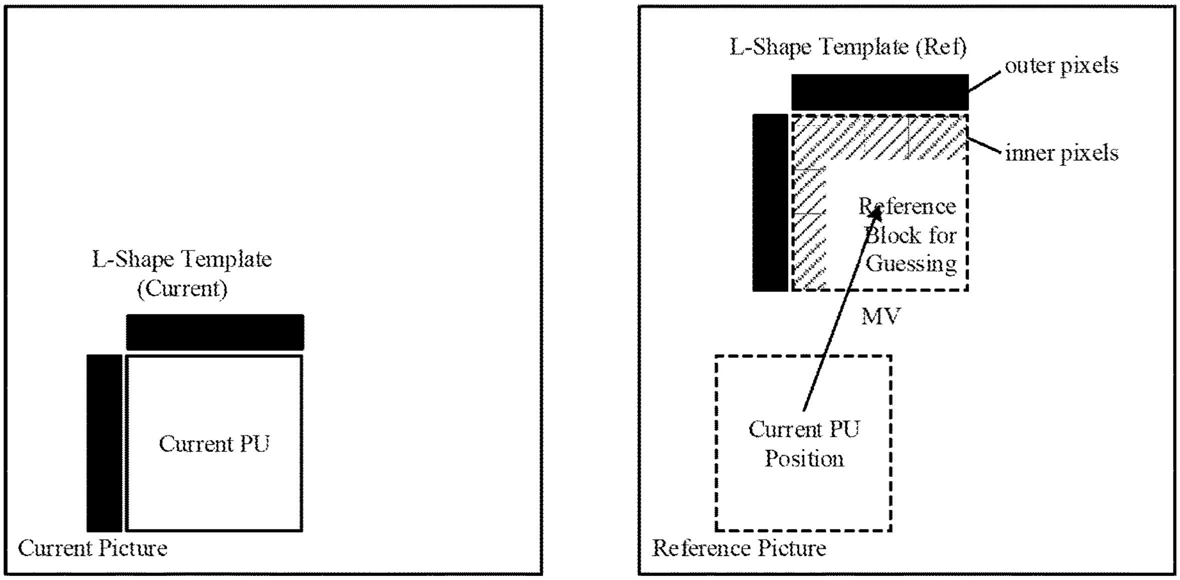

FIGS. 04-05 conceptually illustrate the L-shape matching method for calculating the guess-costs of selected candidates. FIG. 04 shows a L-shape template of the current CU (current template) in the current picture that includes some pixels around top and left boundaries of current PU. The L-shape template of reference picture includes some pixels around top and left boundaries of reference_block_for_guessing for current merge candidate. The reference_block_for_guessing (with width BW and height BH same as current PU) is the block pointed by integer part of the motion vector of the current merge candidate.

Different embodiments define the L-shape template differently. In some embodiments, all pixels of L-shape template are outside the reference_block_for_guessing (as "outer pixels" label in FIG. 04). In some embodiments, all pixels of L-shape template are inside the reference_block_for_guessing (as "inner pixels" label in FIG. 04). In some embodiments, some pixels of L-shape template are outside the reference_block_for_guessing and some pixels of L-shape template are inside the reference_block_for_guessing. FIG. 05 shows a L-shape template of the current PU (current template) in the current picture that is similar to that of FIG. 04 but has no left-top corner pixels, and the L-shape template in the reference picture (of outer pixel embodiment) has no left-top corner pixels.

In some embodiments, the L-shaped matching method and the corresponding L-shape template (named template_std) is defined according to the following: assuming the width of current PU is BW, and height of current PU is BH, the L-shape template of current picture has a top part and a left part. Defining top thick=TTH, left thick=LTH, then, the top part includes all current picture pixels of coordinate (ltx+tj, lty−ti), in which ltx is the Left-top integer pixel horizontal coordinate of the current PU, lty is the Left-top integer pixel vertical coordinate of the current PU, ti is an index for pixel lines (ti is 0~(TTH−1)), tj is a pixel index in a line (tj is 0~BW−1). For the left part, it includes all current picture pixels of coordinate (ltx−tjl, lty+til), in which ltx is the Left-top integer pixel horizontal coordinate of the current PU, lty is the Left-top integer pixel vertical coordinate of the current PU, til is a pixel index in a column (til is 0~(BH−1)), tjl is an index of columns (tjl is 0~(LTH−1)).

In template_std, the L-shape template of reference picture has a top part and a left part. Defining top thick=TTHR, left thick=LTHR, then, top part includes all reference picture pixels of coordinate (ltxr+tjr, ltyr−tir+shifty), in which ltxr is the Left-top integer pixel horizontal coordinate of the reference_block_for_guessing, ltyr is the Left-top integer pixel vertical coordinate of the reference_block_for_guessing, tir is an index for pixel lines (tir is 0~(TTHR−1)), tjr is a pixel index in a line (tjr is 0~BW−1), shifty is a pre-define shift value. For the left part, it consists of all reference picture pixels of coordinate (ltxr−tjlr+shiftx, ltyr+tilr), in which ltxr is the Left-top integer pixel horizontal coordinate of the reference_block_for_guessing, ltyr is the Left-top integer pixel vertical coordinate of the reference_block_for_guessing, tilr is a pixel index in a column (tilr is 0~(BH−1)), tjlr is an index of columns (tjlr is 0~(LTHR−1)), shiftx is a pre-define shift value.

There is one L-shape template for reference picture if the current candidate only has L0 MV or only has L1 MV. But there are 2 L-shape templates for the reference picture if the current candidate has both L0 and L1 MVs (bi-prediction candidate), one template is pointed to by the L0 MV in the L0 reference picture, the other template is pointed to by L1 MV in the L1 reference picture.

In some embodiments, for the L-shape template, the video coder has an adaptive thickness mode. The thickness is defined as the number of pixel rows for the top part in L-shape template or the number of pixel columns for the left part in L-shape template. For the previously mentioned L-shape template template_std, the top thickness is TTH and left thickness is LTH in the L-shape template of current picture, and the top thickness is TTHR and left thickness is LTHR in the L-shape template of reference picture. The adaptive thickness mode changes the top thickness or left thickness depending on some conditions, such as the current PU size or the current PU shape (width or height) or the QP of current slice. For example, the adaptive thickness mode can let top thickness=2 if current PU height≥32, and top thickness=1 if current PU height<32.

When performing L-shape template matching, the video coder retrieves the L-shape template of current picture and L-shape template of reference picture, and compares (matches) the difference between the two templates. The difference (e.g., Sum of Absolute Difference, or SAD) between the pixels in the two templates is used as the cost of the MV. In some embodiments, the video coder may obtain the selected pixels from the L-shape template of the current picture and the selected pixels from the L-shape template of reference picture before computing the difference between the selected pixels of the two L-shape templates.

II. Candidates List of Geometric Prediction Mode (GPM)

In VVC, a geometric partitioning mode is supported for inter prediction. The geometric partitioning mode (GPM) is signalled using a CU-level flag as one kind of merge mode, with other merge modes that includes the regular merge mode, the MMVD mode, the CIIP mode, and the subblock merge mode. In total 64 partitions are supported by geometric partitioning mode for each possible CU size $w \times h = 2^m \times 2^n$ with $m, n \in \{3 \ldots 6\}$ excluding 8×64 and 64×8.

Figure 6:
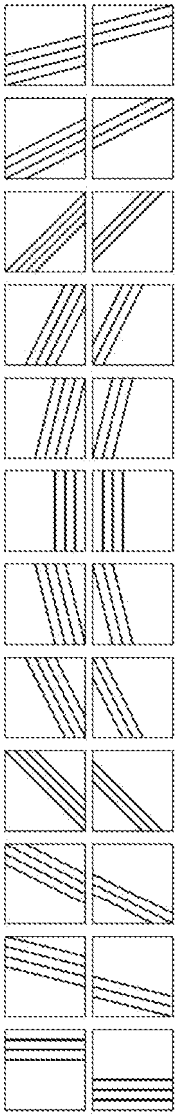
FIG. 06 illustrates the partitioning of a CU by the geometric partitioning mode (GPM).

FIG. 06 illustrates the partitioning of a CU by the geometric partitioning mode (GPM). Each GPM partitioning or GPM split is characterized by a distance-angle pairing that defines a bisecting line. The figure illustrates examples of the GPM splits grouped by identical angles. As illustrated, when GPM is used, a CU is split into two parts by a geometrically located straight line. The location of the splitting line is mathematically derived from the angle and offset parameters of a specific partition.

Each part of a geometric partition in the CU is inter-predicted using its own motion (vector). Only uni-prediction is allowed for each partition, that is, each part has one motion vector and one reference index. The uni-prediction motion constraint is applied to ensure that, similar to conventional bi-prediction, only two motion compensated prediction are performed for each CU.

If GPM is used for the current CU, then a geometric partition index indicating the partition mode of the geometric partition (angle and offset) and two merge indices (one for each partition) are further signalled. The merge index of a geometric partition is used to select a candidate from a uni-prediction candidate list (also referred to as the GPM candidate list). The maximum number of candidates in the GPM candidate list is signalled explicitly in SPS to specify syntax binarization for GPM merge indices. After predicting each of part of the geometric partition, the sample values along the geometric partition edge are adjusted using a blending processing with adaptive weights. This is the prediction signal for the whole CU, and transform and quantization process will be applied to the whole CU as in other prediction modes. The motion field of the CU as predicted by GPM is then stored.

Figure 7:
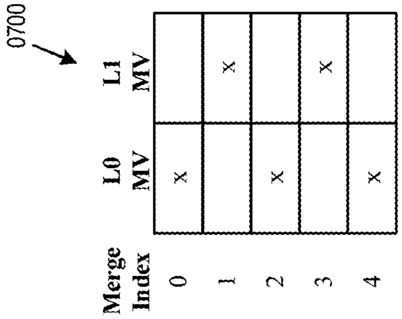
FIG. 07 illustrates an example uni-prediction candidate list for a GPM partition and the selection of a uni-prediction MV for GPM.

The uni-prediction candidate list for a GPM partition (the GPM candidate list) may be derived directly from the merge candidate list of the current CU. FIG. 07 illustrates an example uni-prediction candidate list 0700 for a GPM partition and the selection of a uni-prediction MV for GPM. The GPM candidate list 0700 is constructed in an even-odd manner with only uni-prediction candidates that alternates between L0 MV and L1 MV. Let n be the index of the uni-prediction motion in the uni-prediction candidate list for GPM. The LX (i.e., L0 or L1) motion vector of the n-th extended merge candidate, with X equal to the parity of n, is used as the n-th uni-prediction motion vector for GPM. (These motion vectors are marked with "x" in the figure.) In case a corresponding LX motion vector of the n-th extended merge candidate does not exist, the L(1−X) motion vector of the same candidate is used instead as the uni-prediction motion vector for GPM.

As mentioned, the sample values along the geometric partition edge are adjusted using a blending processing with adaptive weights. Specifically, after predicting each part of a geometric partition using its own motion, blending is applied to the two prediction signals to derive samples around geometric partition edge. The blending weight for each position of the CU are derived based on the distance between individual position and the partition edge. The distance for a position (x,y) to the partition edge are derived as:

$$d(x, y) = (2x + 1 - w)\cos(\varphi_i) + (2y + 1 - h)\sin(\varphi_i) - \rho_j \quad (1)$$

$$\rho_j = \rho_{x,j}\cos(\varphi_i) + \rho_{y,j}\sin(\varphi_i) \quad (2)$$

$$\rho_{x,j} = \begin{cases} 0 & i \,\%\, 16 = 8 \text{ or } (i \,\%\, 16 \neq 0 \text{ and } h \geq w) \\ \pm(j \times w) \gg 2 & \text{otherwise} \end{cases} \quad (3)$$

$$\rho_{y,j} = \begin{cases} \pm(j \times h) \gg 2 & i \,\%\, 16 = 8 \text{ or } (i \,\%\, 16 \neq 0 \text{ and } h \geq w) \\ 0 & \text{otherwise} \end{cases} \quad (4)$$

where i, j are the indices for angle and offset of a geometric partition, which depend on the signaled geometric partition index. The sign of $\rho_{x,j}$ and $\rho_{y,j}$ depend on angle index i. The weights for each part of a geometric partition are derived as following:

$$wIdxL(x, y) = partIdx\,?\,32 + d(x, y):\ 32 - d(x, y) \quad (5)$$

$$w_0(x, y) = \frac{\text{Clip3}(0, 8, (wIdxL(x, y) + 4) \gg 3)}{8} \quad (6)$$

$$w_1(x, y) = 1 - w_0(x, y) \quad (7)$$

Figure 8:
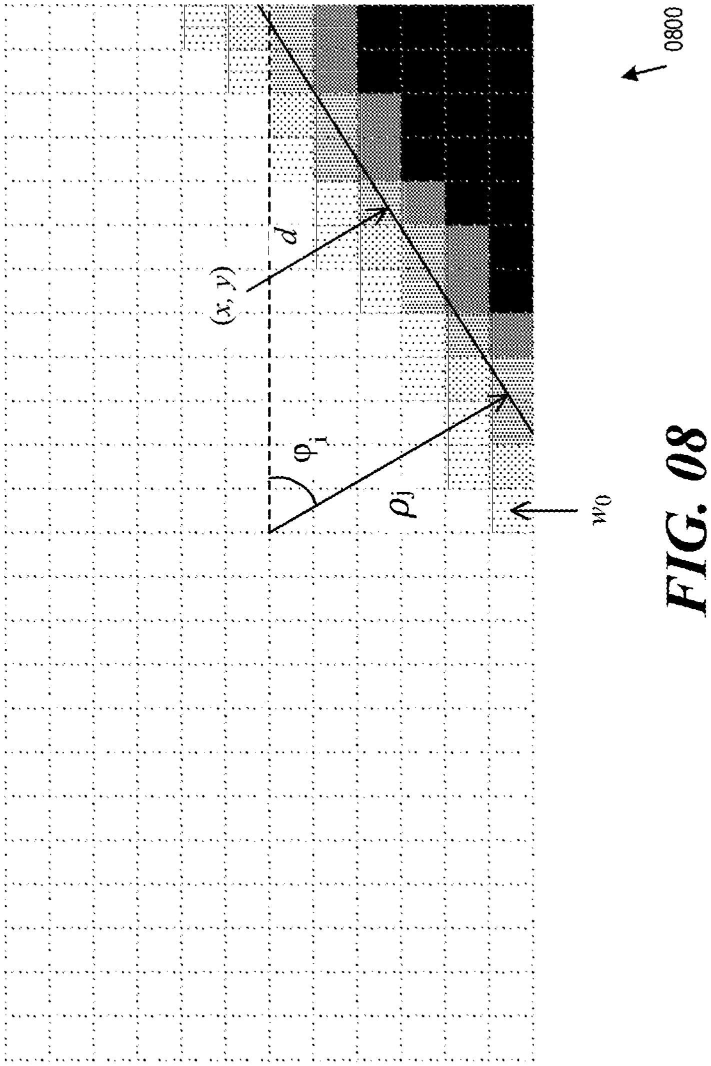
FIG. 08 illustrates an example partition edge blending process for GPM for a CU.

The variable partIdx depends on the angle index i. FIG. 08 illustrates an example partition edge blending process for GPM for a CU 0800. In the figure, blending weights are generated based on an initial blending weight $w_0$.

As mentioned, the motion field of a CU predicted using GPM is stored. Specifically, Mv1 from the first part of the geometric partition, Mv2 from the second part of the geometric partition and a combined Mv of Mv1 and Mv2 are stored in the motion field of the GPM coded CU. The stored motion vector type for each individual position in the motion filed are determined as:

$$sType = \text{abs}(motionIdx) < 32\,?\ 2 : (motionIdx \leq 0\,?\,(1 - partIdx) : partIdx) \quad (8)$$

where motionIdx is equal to d(4x+2, 4y+2), which is recalculated from equation (4-1). The partIdx depends on the angle index i. If sType is equal to 0 or 1, Mv0 or Mv1 are stored in the corresponding motion field, otherwise if sType is equal to 2, a combined Mv from Mv0 and Mv2 are stored. The combined Mv are generated using the following process: (i) If Mv1 and Mv2 are from different reference picture lists (one from L0 and the other from L1), then Mv1 and Mv2 are simply combined to form the bi-prediction motion vectors; (ii) otherwise, if Mv1 and Mv2 are from the same list, only uni-prediction motion Mv2 is stored.

Figure 9:
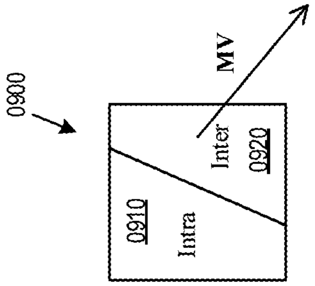
FIG. 09 illustrates a CU that is coded by GPM-Intra.

A block being coded by GPM may have one partition coded in inter mode and one partition coded intra mode. Such a GPM mode may be referred to as GPM with intra and inter, or GPM-Intra. FIG. 09 illustrates a CU 0900 that is coded by GPM-Intra, in which a first GPM partition 0910 is coded by intra prediction and a second GPM partition 0920 is coded by inter prediction.

In some embodiments, each GPM partition has a corresponding flag in the bitstream to indicate whether the GPM partition is coded by intra or inter prediction. For the GPM partition that is coded inter prediction (e.g., the partition 0920), the prediction signal is generated by MVs from the merge candidate list of the CU. For the GPM partition that is coded by intra prediction (e.g., the partition 0910), the prediction signal is generated from the neighboring pixels for the intra prediction mode specified by an index from the encoder. The variation of the possible intra prediction modes may be restricted by the geometric shapes. The final prediction of the GPM coded CU (e.g., the CU 0900) is produced by combining (with blending at partition edge) the prediction of the inter-predicted partition and the prediction of the intra-predicted partition as in regular GPM mode (i.e., having two inter-predicted partitions).

In some embodiments, bi-prediction candidates are allowed into the GPM candidate list by reusing merge candidate list. In some embodiments, the merge candidate list (which includes uni-prediction and/or bi-prediction candidates) is used as the GPM candidate list. In some embodiments, the GPM candidate list that may include bi-prediction candidates (e.g., reusing the merge candidate list described above by reference to FIG. 01) is only allowed in small CU (having size smaller than a threshold) and/or when GPM-Intra (e.g., a GPM mode that combines inter and intra prediction described above by reference to FIG. 09) is enabled in order to constrain motion compensation bandwidth. Otherwise (CU larger than or equal to a threshold) the GPM candidate list is constructed in an even-odd manner (e.g., the GPM candidate list 0700 of FIG. 07) with only uni-prediction allowed.

III. GPM Candidate Reordering

As mentioned, the GPM candidate list may be derived from the merge candidate list, though motion compensation bandwidth constraint may limit the GPM candidate list to include only uni-prediction candidates (e.g., based on size of CU as mentioned in Section II). The behavior of MV selection during GPM candidate list construction may lead to imprecise MVs for GPM blending. In order to improve coding efficiency, some embodiments of the disclosure provide methods of candidates reordering and MV refinement for GPM.

In some embodiments, a video coder (encoder or decoder) reorders MV candidates for GPM (in GPM candidate list) by sorting the GPM MV candidates according to template matching cost in ascending order. The reorder behavior may be applied on merge candidate list before GPM candidate list construction and/or on GPM candidate list itself. The TM cost of a MV in the GPM candidate list maybe calculated by matching the reference template identified by the MV in a reference picture with the current template of the current CU.

Figure 10:
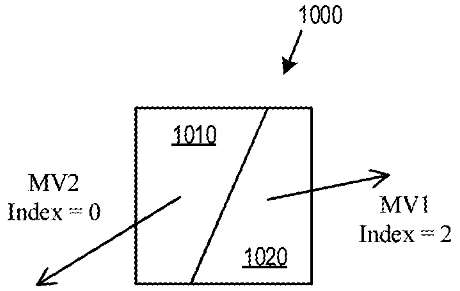
FIG. 10 conceptually illustrates a CU that is coded by using MVs from a reordered GPM candidate list.

FIG. 10 conceptually illustrates a CU that is coded by using MVs from a reordered GPM candidate list. As illustrated, a CU 1000 is to be coded by GPM mode and is to be partitioned into a first GPM partition 1010 and a second GPM partition 1020 based on a GPM distance-angle pair. A GPM candidate list 1005 is generated for the CU 1000. The GPM candidate list may be restricted to having only uni-prediction candidates in an even-odd manner, or may reuse merge candidates that include bi-prediction candidates. Each candidate MV in the GPM candidate list 1005 is tested for TM cost. Based on the calculated TM costs of the candidate MVs, each MV is assigned a reordered index that can be signaled in the bitstream. In the example, "MV0" has TM cost=30 and is assigned reordered index 1, "MV1" has TM cost=45 and is assigned reordered index 2, etc.

In the example, to select candidate MVs for the two GPM partitions, the video coder may signal the reordered index '0' to select "MV2" for the partition 1010 and reordered index '2' to select "MV1" for the partition 1020.

In some embodiments, the video coder reorders the partition (or split) modes of each GPM candidate in the GPM candidate list. The video coder obtains the reference templates of all GPM split modes (i.e., all distance-angle GPM pairing for the CU, as described above by reference to FIG. 06) and computes the template matching cost for each GPM split mode. The GPM split modes are then reordered according to the TM costs in ascending order. The video coder may identify the N candidates with the best TM costs as available split modes.

Figure 11:
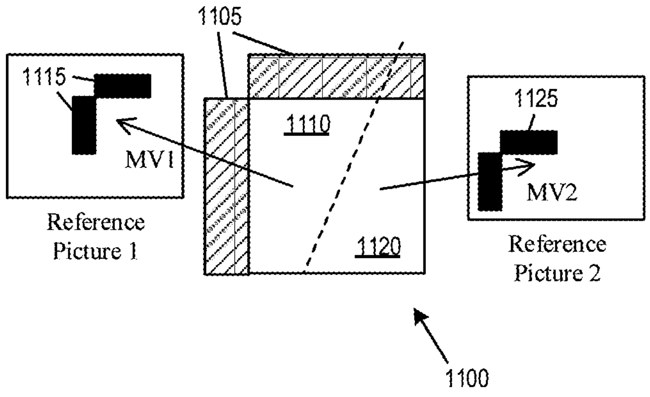
FIG. 11 conceptually illustrates reordering the different candidate GPM split modes according to TM cost when coding a CU.

FIG. 11 conceptually illustrates reordering the different candidate GPM split modes according to TM cost when coding a CU 1100. The video coder calculates the TM cost for each GPM split mode (distance-angle pair) and assigns a reordered index to each GPM split mode based on the TM cost of the split mode. The GPM predictors derived from the different MV candidates and partition/split modes are reordered by template matching costs in ascending order. The video coder may designate the best N candidates with least matching costs as available partition modes.

In the example, the split mode 1101 has TM cost=70 and is assigned reordered index '2', split mode 1102 has TM cost=45 and is assigned reordered index '1', split mode 1103 has TM cost=100 and is not assigned a reordered index (because it is not one of the N best candidates), split mode 1104 has TM cost=30 and is assigned reordered index '0', etc. Thus, the video coder may signal the selection of split mode 1104 by signaling reordered index '0'.

In some embodiments, the TM cost of a candidate GPM split mode is calculated based on the MV predictors of the two GPM partitions of the candidate. In the example of FIG. 11, to calculate the TM cost for a particular candidate GPM split mode (angle-distance pair) that split the CU 1100 into GPM partitions 1110 and 1120, the MV predictors of the two GPM partitions are used to identify two respective reference templates (1115 and 1125). The two reference templates are combined (with edge blending) into a combined reference template. The template matching cost of the candidate GPM split is then computed by matching the combined reference template with the current template 1105 of the CU 1100.

IV. GPM Motion Vector Refinement

In some embodiments, the video coder refines MV of each geometric partition (GPM partition) by searching based on template matching (TM) cost. The video coder may refine the motion vector of each geometric partition for each candidate in the GPM candidate list (merge candidates or uni-prediction only candidates) following a certain searching process. The process includes several search steps. Each search step can be represented by a tuple of (identifier, search pattern, search step, number of iterative rounds). The search steps are performed sequentially according to the values of the search step identifiers in ascending order. In some embodiments, the video coder refines the MV(s) in the GPM candidate list prior to TM-cost-based reordering. In some embodiments, the video coder refines the MV(s) that have been selected for the GPM partitions.

For some embodiments, the process of a search step (a single run of iterative search) is as follows. For a MV to be used for coding a GPM partition (e.g., a candidate MV in the GPM candidate list), the video coder refines the MV by:

1) inherit the best MV and the best cost from a previous round or previous search step; (if this is the first search step for the GPM partition, use an initial MV of the GPM partition as the best MV);
2) treat the best MV as the center of a search range;
3) construct a MV candidate list (or MV search list) according to a search pattern (e.g., diamond, cross, brute force, etc.);
4) compute TM cost for all candidates in the constructed MV candidate list of the search pattern; and
5) identify the MV candidate (in the MV candidate list of the search pattern) with the minimum TM cost as the refined MV of the GPM partition.

Figure 12:
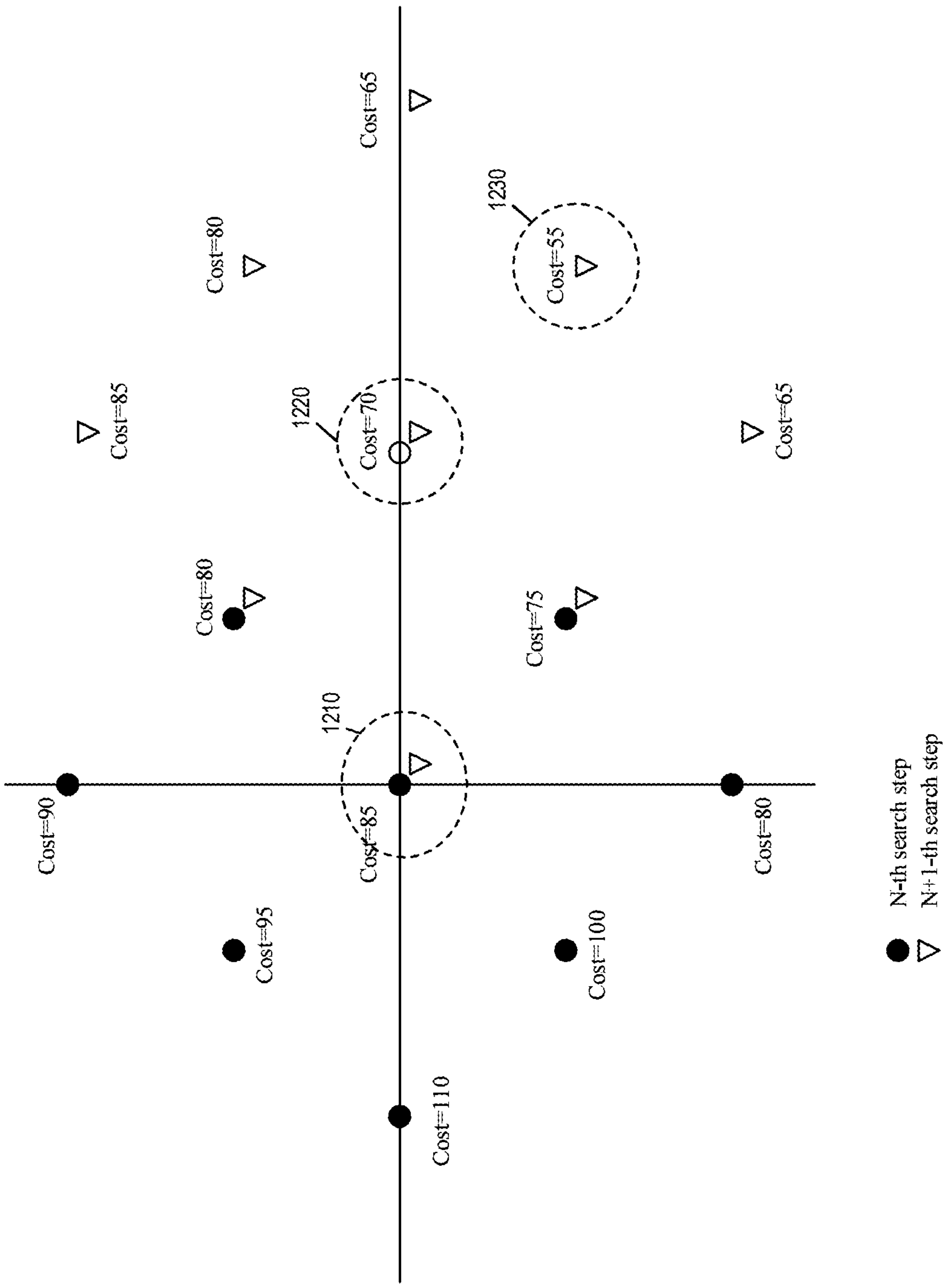
FIG. 12 conceptually illustrates MV refinement based on TM costs.

FIG. 12 conceptually illustrates MV refinement based on TM costs. The calculation of TM cost for a MV is described by reference to FIGS. 04-05 above. In the example, for a N-th search step, the video coder performs one round of search centered at the initial MV 1210, such that TM costs are computed for MV candidates at diamond positions around 1210. Among these, the MV candidate at position 1220 has the lowest TM cost (cost=70). Thereafter, the video coder performs another round of search (N+1-th search step) centered at the MV position 1220, by computing TM costs for MV candidates at diamond positions around 1220. In this round of search, the candidate at MV position 1230 has the best cost (cost=50), which is still lower than the previous best cost (70), so the search continues.

Initially, the MV candidate list is constructed according to a search pattern (diamond/cross/others) and the best MV that is inherited from previous round or previous search step. The template matching costs are computed for each MV candidate in the list. The best MV and the best cost are updated if the cost of the MV candidate with the minimum template matching cost (denoted as tmp_cost) is smaller than the best cost. This iterative search is terminated if the best cost is unchanged or the difference between tmp_cost and the best cost are smaller than a certain threshold. And the overall search process is terminated if n rounds search have been performed. Otherwise, the MV is refined iteratively.

In some embodiments, the video coder applies different search patterns at different resolutions at different iterations or rounds of the search process. Specifically, the motion vector of each geometric partition for each candidate in the GPM candidate list is refined by the following searching process:

1) Do full-pel diamond search with n1 rounds,
2) Do full-pel cross search with n2 rounds,
3) Do half-pel cross search with n3 rounds,
4) Do quarter-pel cross search with n4 rounds,
5) Do ⅛-pel cross search with n5 rounds,
6) Do 1/16-pel cross search with n6 rounds.

At least one of n1 to n6 is greater than zero (e.g., n1=128, n2 . . . n5=1, n6=0). The search step is skipped if n equal to zero. The mv candidates of diamond search includes (2,0), (1,1), (0,2), (−1,1), (−2,0), (−1,−1), (0,−2), (1,−1). The MV candidates of cross search includes (1,0), (0,1), (−1,0), (0,−1).

In some embodiments, the motion vector of each geometric partition for each candidate in the GPM merge candidate list is refined by the following searching process:

1) Determine a search precision (for each search step) by choosing from full-pel, half-pel, quarter-pel, ⅛-pel, and 1/16 pel.
2) Include all MV candidates in the search range according to the determined search precision into the candidate list.
3) Find the best MV candidate with the minimum template matching cost. The best MV candidate is the refined MV.

V. Example Video Encoder

Figure 13:
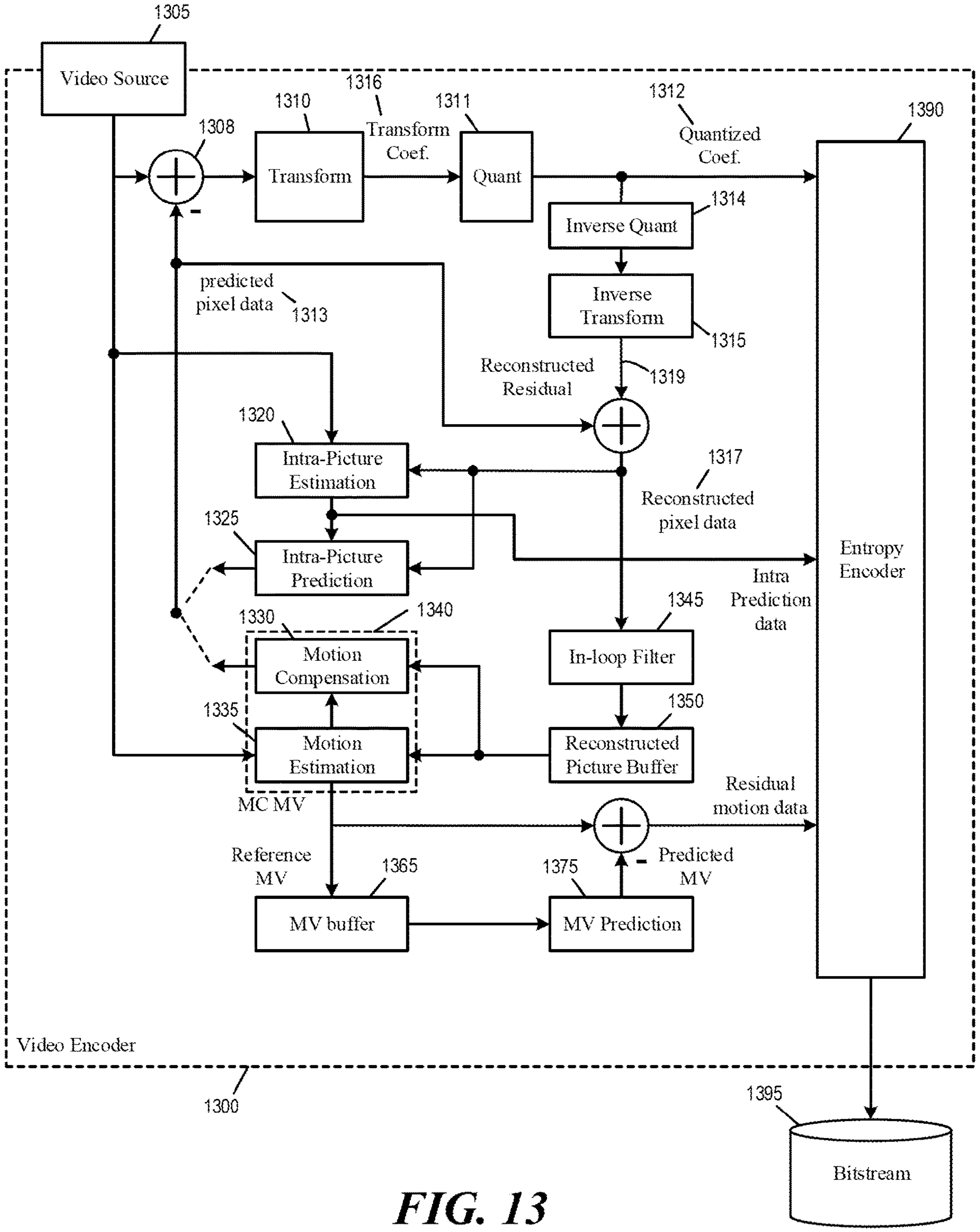
FIG. 13 illustrates an example video encoder that may select prediction candidates based on TM costs.

FIG. 13 illustrates an example video encoder 1300 that may select prediction candidates based on TM costs. As illustrated, the video encoder 1300 receives input video signal from a video source 1305 and encodes the signal into bitstream 1395. The video encoder 1300 has several components or modules for encoding the signal from the video source 1305, at least including some components selected from a transform module 1310, a quantization module 1311, an inverse quantization module 1314, an inverse transform module 1315, an intra-picture estimation module 1320, an intra-prediction module 1325, a motion compensation module 1330, a motion estimation module 1335, an in-loop filter 1345, a reconstructed picture buffer 1350, a MV buffer 1365, and a MV prediction module 1375, and an entropy encoder 1390. The motion compensation module 1330 and the motion estimation module 1335 are part of an inter-prediction module 1340.

In some embodiments, the modules 1310-1390 are modules of software instructions being executed by one or more processing units (e.g., a processor) of a computing device or electronic apparatus. In some embodiments, the modules 1310-1390 are modules of hardware circuits implemented by one or more integrated circuits (ICs) of an electronic apparatus. Though the modules 1310-1390 are illustrated as being separate modules, some of the modules can be combined into a single module.

The video source 1305 provides a raw video signal that presents pixel data of each video frame without compression. A subtractor 1308 computes the difference between the raw video pixel data of the video source 1305 and the predicted pixel data 1313 from the motion compensation module 1330 or intra-prediction module 1325. The transform module 1310 converts the difference (or the residual pixel data or residual signal 1308) into transform coefficients (e.g., by performing Discrete Cosine Transform, or DCT). The quantization module 1311 quantizes the transform coefficients into quantized data (or quantized coefficients) 1312, which is encoded into the bitstream 1395 by the entropy encoder 1390.

The inverse quantization module 1314 de-quantizes the quantized data (or quantized coefficients) 1312 to obtain transform coefficients, and the inverse transform module 1315 performs inverse transform on the transform coefficients to produce reconstructed residual 1319. The reconstructed residual 1319 is added with the predicted pixel data 1313 to produce reconstructed pixel data 1317. In some embodiments, the reconstructed pixel data 1317 is temporarily stored in a line buffer (not illustrated) for intra-picture prediction and spatial MV prediction. The reconstructed pixels are filtered by the in-loop filter 1345 and stored in the reconstructed picture buffer 1350. In some embodiments, the reconstructed picture buffer 1350 is a storage external to the video encoder 1300. In some embodiments, the reconstructed picture buffer 1350 is a storage internal to the video encoder 1300.

The intra-picture estimation module 1320 performs intra-prediction based on the reconstructed pixel data 1317 to produce intra prediction data. The intra-prediction data is provided to the entropy encoder 1390 to be encoded into bitstream 1395. The intra-prediction data is also used by the intra-prediction module 1325 to produce the predicted pixel data 1313.

The motion estimation module 1335 performs inter-prediction by producing MVs to reference pixel data of previously decoded frames stored in the reconstructed picture buffer 1350. These MVs are provided to the motion compensation module 1330 to produce predicted pixel data.

Instead of encoding the complete actual MVs in the bitstream, the video encoder 1300 uses MV prediction to generate predicted MVs, and the difference between the MVs used for motion compensation and the predicted MVs is encoded as residual motion data and stored in the bitstream 1395.

The MV prediction module 1375 generates the predicted MVs based on reference MVs that were generated for encoding previously video frames, i.e., the motion compensation MVs that were used to perform motion compensation. The MV prediction module 1375 retrieves reference MVs from previous video frames from the MV buffer 1365. The video encoder 1300 stores the MVs generated for the current video frame in the MV buffer 1365 as reference MVs for generating predicted MVs.

The MV prediction module 1375 uses the reference MVs to create the predicted MVs. The predicted MVs can be computed by spatial MV prediction or temporal MV prediction. The difference between the predicted MVs and the motion compensation MVs (MC MVs) of the current frame (residual motion data) are encoded into the bitstream 1395 by the entropy encoder 1390.

The entropy encoder 1390 encodes various parameters and data into the bitstream 1395 by using entropy-coding techniques such as context-adaptive binary arithmetic coding (CABAC) or Huffman encoding. The entropy encoder 1390 encodes various header elements, flags, along with the quantized transform coefficients 1312, and the residual motion data as syntax elements into the bitstream 1395. The bitstream 1395 is in turn stored in a storage device or transmitted to a decoder over a communications medium such as a network.

The in-loop filter 1345 performs filtering or smoothing operations on the reconstructed pixel data 1317 to reduce the artifacts of coding, particularly at boundaries of pixel blocks. In some embodiments, the filtering operation performed includes sample adaptive offset (SAO). In some embodiment, the filtering operations include adaptive loop filter (ALF).

Figure 14:
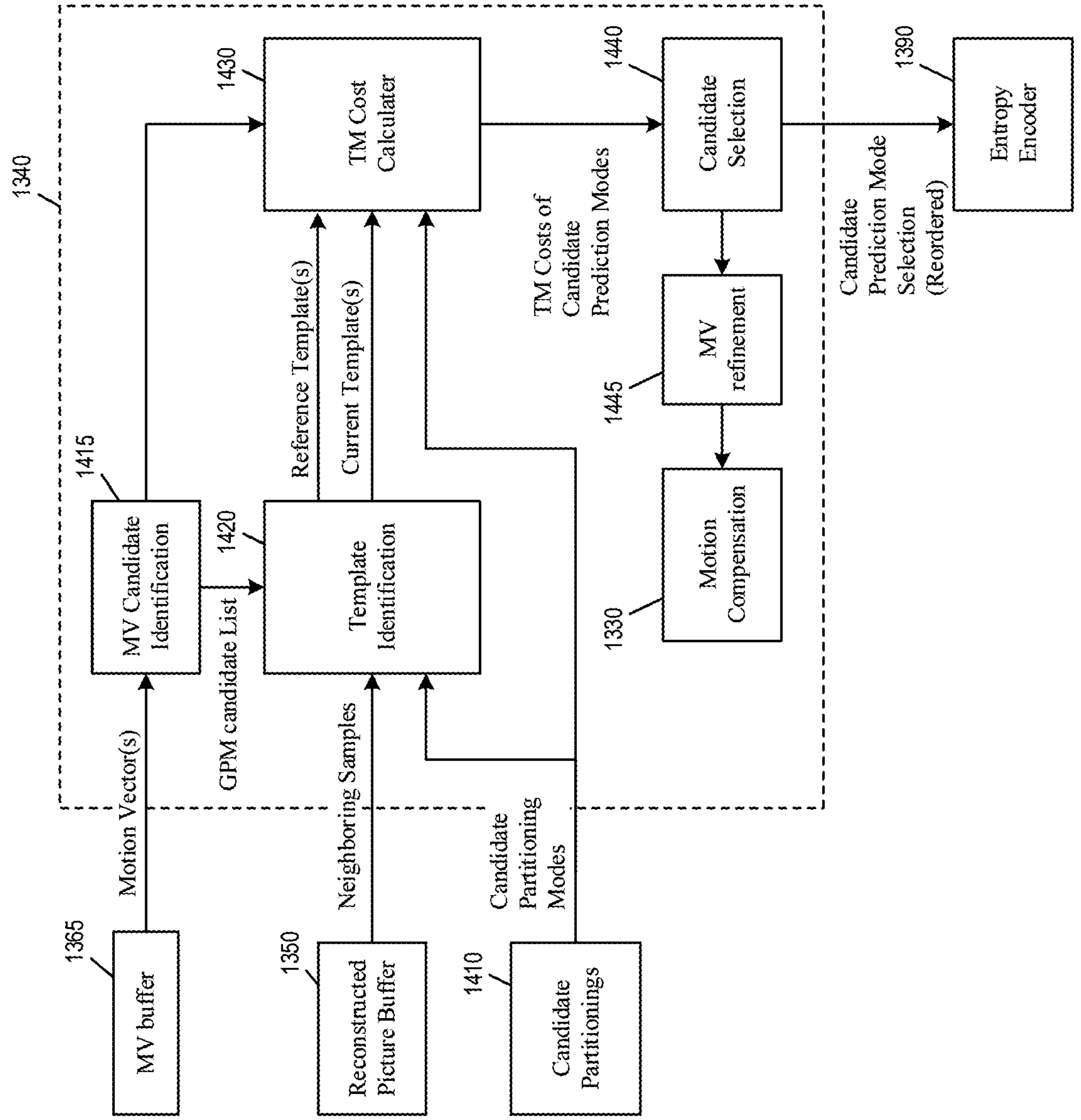
FIG. 14 illustrates portions of the video encoder that implement candidate prediction mode selection based on TM costs.

FIG. 14 illustrates portions of the video encoder 1300 that implement candidate prediction mode selection based on TM costs. Specifically, the figure illustrates the components of the inter-prediction module 1340 of the video encoder 1300. A candidate partitioning module 1410 provide candidate partitioning modes indicators to the inter-prediction module 1340. These possible candidate partitioning modes may correspond to various angle-distance pairings that defines a line that bisects the current block into two (or more) partitions according to GPM. A MV candidate identification module 1415 identifies MV candidates (as the GPM candidate list) that can be used for GPM partitions. The MV candidate identification module 1415 may identify only uni-prediction candidates or reuse merge prediction candidates from the MV buffer 1365.

For each motion vector in the GPM candidate list and/or for each candidate partitioning modes, a template identification module 1420 retrieves neighboring samples from the reconstructed picture buffer 1350 as L-shaped templates. For a candidate partitioning mode that partitions the block into two partitions, the template identification module 1420 may retrieve neighboring pixels of the current block as two current templates and use two motion vectors to retrieve two L-shaped pixel sets as two reference templates for the two partitions of the current block.

The template identification module 1420 provides the reference template(s) and the current template(s) of the currently indicated coding mode to a TM cost calculator 1430, which performs matching to produce a TM cost for the indicated candidate partitioning mode. The TM cost calculator 1430 may combine the reference templates (with edge blending) according to GPM mode. The TM cost calculator 1430 may also compute TM costs for candidate MVs in the GPM candidate list. The TM cost calculator 1440 may also assign reordered indices to the candidate prediction modes (MVs or partitioning modes) based on the computed TM costs. TM-cost-based indices reordering is described in Section III above.

The computed TM costs of the various candidates are provided to a candidate selection module 1440, which may use the TM costs to select a lowest cost candidate prediction mode for encoding the current block. The selected candidate prediction mode (can be MVs and/or partitioning mode) is indicated to the motion compensation module 1330 to complete prediction for encoding the current block. The selected prediction mode is also provided to the entropy encoder 1390 to be signaled in the bitstream. The selected prediction mode may be signaled by using the prediction mode's corresponding reordered index to reduce the number of bits transmitted. In some embodiments, the MVs provided to the motion compensation 1330 is refined (at a MV refinement module 1445) using a search process that is described in Section IV above.

Figure 15:
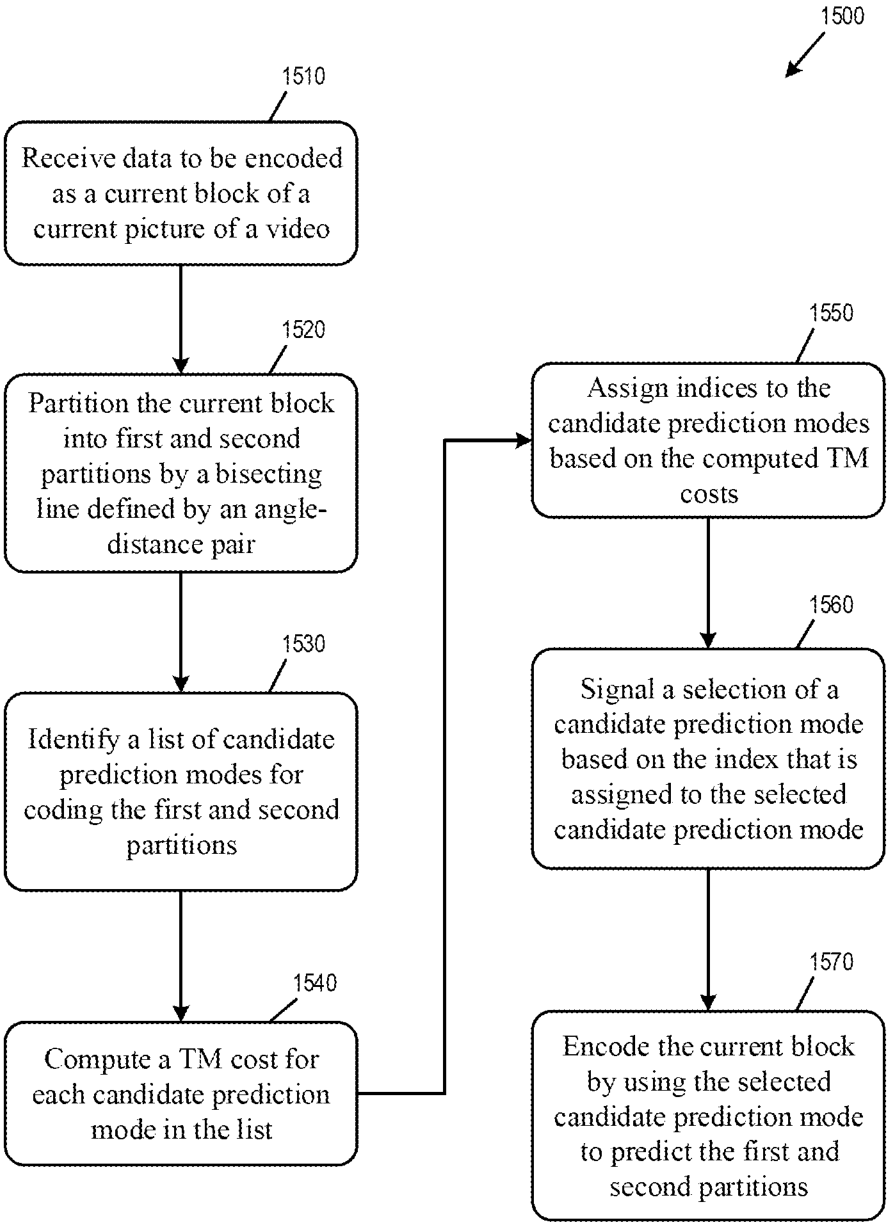
FIG. 15 conceptually illustrates a process that assigns indices to prediction candidates based on TM costs for encoding a pixel block.

FIG. 15 conceptually illustrates a process 1500 that assigns indices to prediction candidates based on TM costs for encoding a pixel block. In some embodiments, one or more processing units (e.g., a processor) of a computing device implements the encoder 1300 performs the process 1500 by executing instructions stored in a computer readable medium. In some embodiments, an electronic apparatus implementing the encoder 1300 performs the process 1500.

The encoder receives (at block 1510) data to be encoded into a bitstream as a current block of pixels in a current picture. The encoder partitions (at block 1520) the current block into first and second partitions by a bisecting line defined by an angle-distance pair according to geometric prediction mode (GPM). The first partition may be coded by inter-prediction that references samples in a reference picture and the second partition may be coded by intra-prediction that references neighboring samples of the current block in the current picture. Alternatively, the first and second partitions may both be coded by inter-prediction that use first and second motion vectors from the list to reference samples in first and second reference pictures.

The encoder identifies (at block 1530) a list of candidate prediction modes for coding the first and second partitions. The different candidate prediction modes in the list may correspond to different bisecting lines that are defined by different angle-distances pairings. The different candidate prediction modes in the list may also correspond to different motion vectors that may be selected to generate an inter-prediction for reconstructing the first partition or the second partition of the current block. In some embodiments, the candidate motion vectors in the list are sorted (e.g., in ascending order) according to the computed TM costs of the candidate motion vectors. In some embodiments, the list of candidate prediction modes includes only uni-prediction candidates and no bi-prediction candidates when the current block is greater than a threshold size, and merge candidates when the current block is less than a threshold size.

The encoder computes (at block 1540) a template matching (TM) cost for each candidate prediction mode in the list. The encoder may compute the TM cost of a candidate prediction mode by matching a current template of the current block with a combined template of a first reference template of the first partition and a second reference template of the second partition.

The encoder assigns (at block 1550) indices to the candidate prediction modes based the computed TM costs (e.g., lower cost candidates assigned indices that require fewer bits to signal). The encoder signals (at block 1560) a selection of a candidate prediction mode based on the index that is assigned to the selected candidate prediction mode.

The encoder encodes (at block 1570) the current block (into the bitstream) by using the selected candidate prediction mode, e.g., by using the selected GPM partitioning to define the first and second partitions, and/or by using the selected motion vector to predict and reconstruct the first and second partitions.

In some embodiments, the video encoder reconstructs the current block by using refined motion vectors to generate predictions for the first and second partitions. A refined motion vector is identified by searching for a motion vector having a lowest TM cost based on an initial motion vector. In some embodiments, the search for the motion vector having the lowest TM cost includes iteratively applying a search pattern centered at a motion vector identified as having a lowest TM cost from a previous iteration (until a lower cost can no longer be found). In some embodiments, the encoder applies different search patterns at different resolutions (e.g., 1-pel, ½-pel, ¼-pel, etc.) in different iterations or rounds during the search process for refining the motion vector.

VI. Example Video Decoder

In some embodiments, an encoder may signal (or generate) one or more syntax element in a bitstream, such that a decoder may parse said one or more syntax element from the bitstream.

Figure 16:
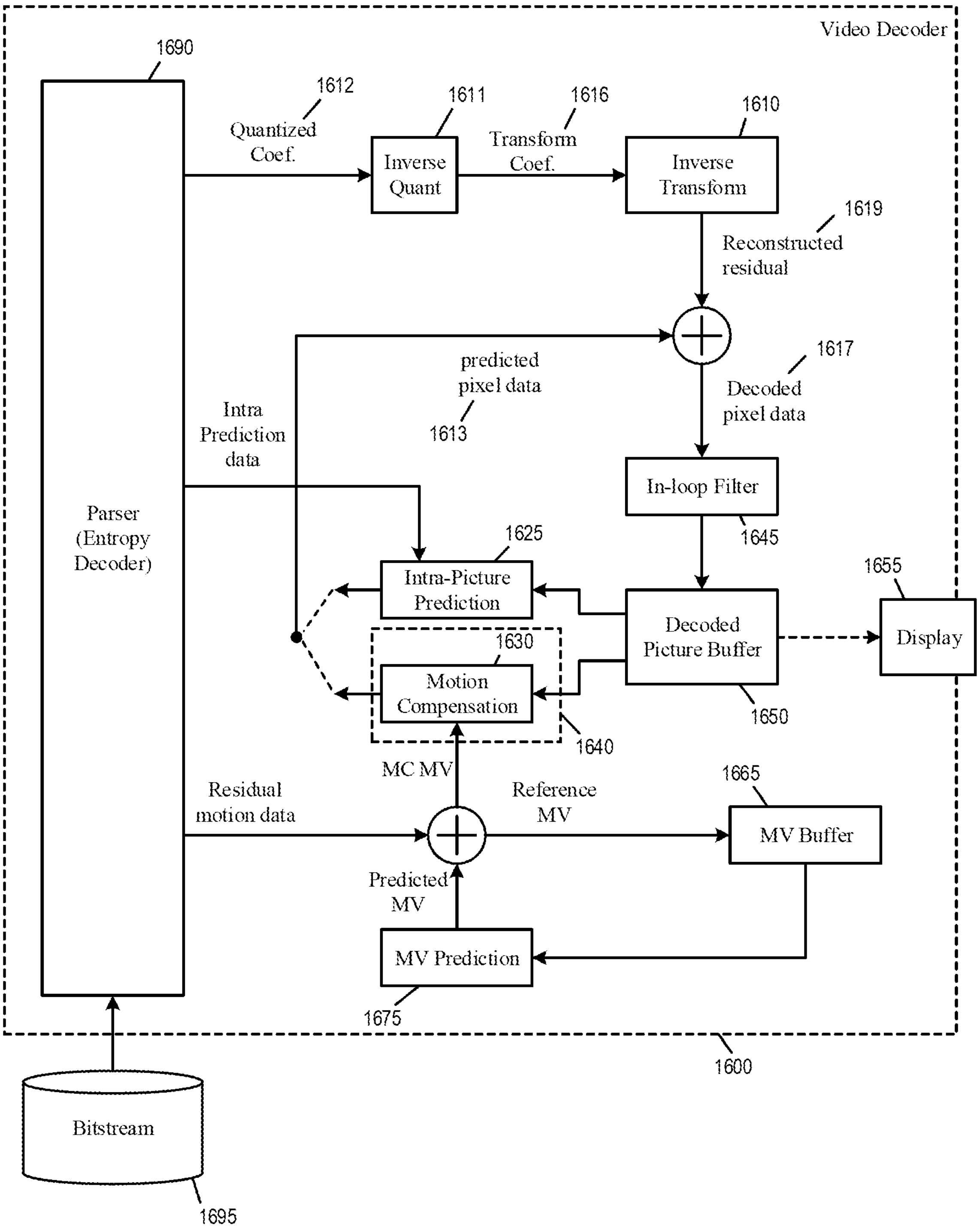
FIG. 16 illustrates an example video decoder that may select prediction candidates based on TM costs.

FIG. 16 illustrates an example video decoder 1600 that may select prediction candidates based on TM costs. As illustrated, the video decoder 1600 is an image-decoding or video-decoding circuit that receives a bitstream 1695 and decodes the content of the bitstream into pixel data of video frames for display. The video decoder 1600 has several components or modules for decoding the bitstream 1695, including some components selected from an inverse quantization module 1611, an inverse transform module 1610, an intra-prediction module 1625, a motion compensation module 1630, an in-loop filter 1645, a decoded picture buffer 1650, a MV buffer 1665, a MV prediction module 1675, and a parser 1690. The motion compensation module 1630 is part of an inter-prediction module 1640.

In some embodiments, the modules 1610-1690 are modules of software instructions being executed by one or more processing units (e.g., a processor) of a computing device. In some embodiments, the modules 1610-1690 are modules of hardware circuits implemented by one or more ICs of an electronic apparatus. Though the modules 1610-1690 are illustrated as being separate modules, some of the modules can be combined into a single module.

The parser 1690 (or entropy decoder) receives the bitstream 1695 and performs initial parsing according to the syntax defined by a video-coding or image-coding standard. The parsed syntax element includes various header elements, flags, as well as quantized data (or quantized coefficients) 1612. The parser 1690 parses out the various syntax elements by using entropy-coding techniques such as context-adaptive binary arithmetic coding (CABAC) or Huffman encoding.

The inverse quantization module 1611 de-quantizes the quantized data (or quantized coefficients) 1612 to obtain transform coefficients, and the inverse transform module 1610 performs inverse transform on the transform coefficients 1616 to produce reconstructed residual signal 1619. The reconstructed residual signal 1619 is added with predicted pixel data 1613 from the intra-prediction module 1625 or the motion compensation module 1630 to produce decoded pixel data 1617. The decoded pixels data are filtered by the in-loop filter 1645 and stored in the decoded picture buffer 1650. In some embodiments, the decoded picture buffer 1650 is a storage external to the video decoder 1600. In some embodiments, the decoded picture buffer 1650 is a storage internal to the video decoder 1600.

The intra-prediction module 1625 receives intra-prediction data from bitstream 1695 and according to which, produces the predicted pixel data 1613 from the decoded pixel data 1617 stored in the decoded picture buffer 1650. In some embodiments, the decoded pixel data 1617 is also stored in a line buffer (not illustrated) for intra-picture prediction and spatial MV prediction.

In some embodiments, the content of the decoded picture buffer 1650 is used for display. A display device 1655 either retrieves the content of the decoded picture buffer 1650 for display directly, or retrieves the content of the decoded picture buffer to a display buffer. In some embodiments, the display device receives pixel values from the decoded picture buffer 1650 through a pixel transport.

The motion compensation module 1630 produces predicted pixel data 1613 from the decoded pixel data 1617 stored in the decoded picture buffer 1650 according to motion compensation MVs (MC MVs). These motion compensation MVs are decoded by adding the residual motion data received from the bitstream 1695 with predicted MVs received from the MV prediction module 1675.

The MV prediction module 1675 generates the predicted MVs based on reference MVs that were generated for decoding previous video frames, e.g., the motion compensation MVs that were used to perform motion compensation. The MV prediction module 1675 retrieves the reference MVs of previous video frames from the MV buffer 1665. The video decoder 1600 stores the motion compensation MVs generated for decoding the current video frame in the MV buffer 1665 as reference MVs for producing predicted MVs.

The in-loop filter 1645 performs filtering or smoothing operations on the decoded pixel data 1617 to reduce the artifacts of coding, particularly at boundaries of pixel blocks. In some embodiments, the filtering operation performed includes sample adaptive offset (SAO). In some embodiment, the filtering operations include adaptive loop filter (ALF).

Figure 17:
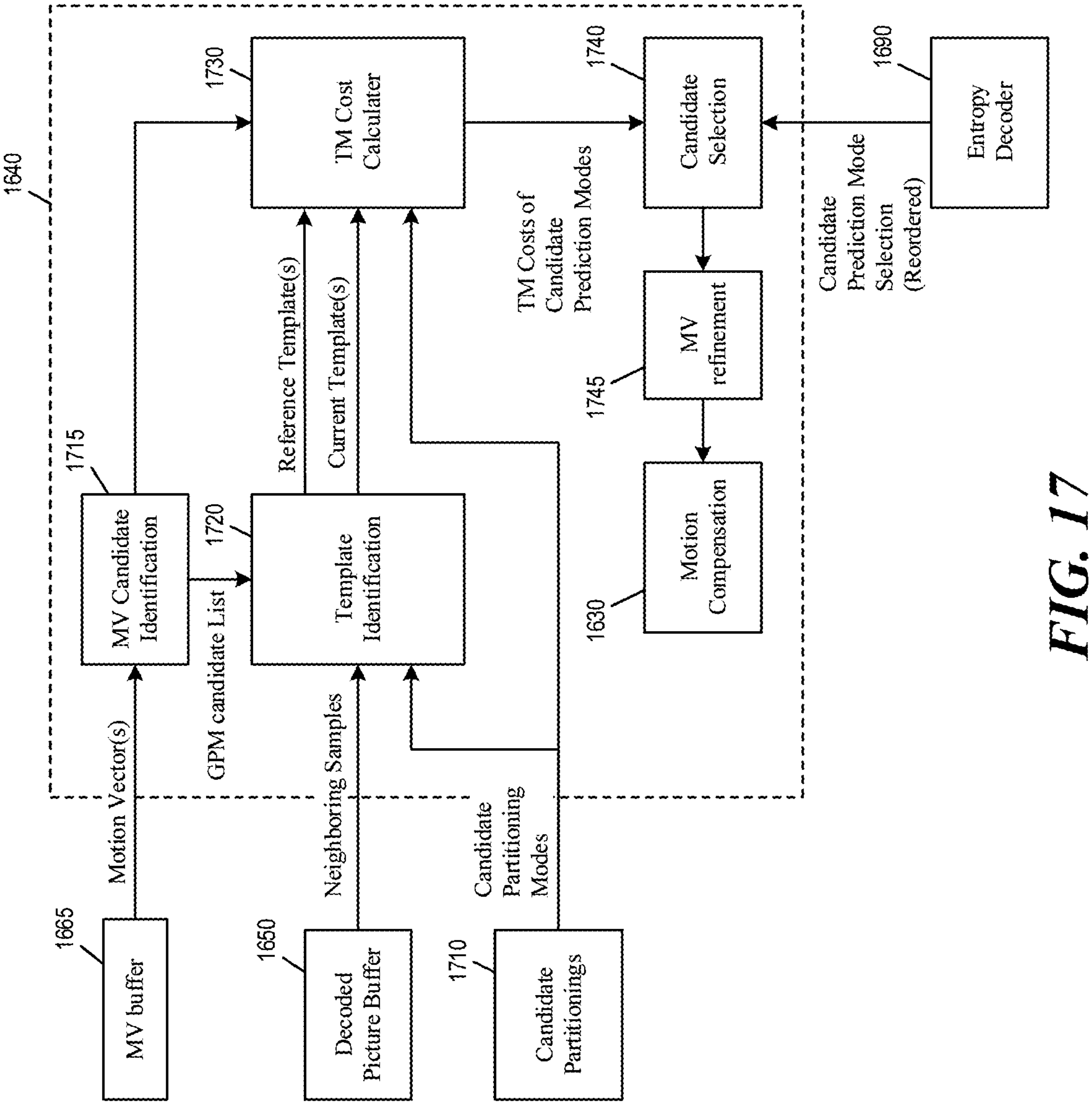
FIG. 17 illustrates portions of the video decoder that implement candidate prediction mode selection based on TM costs.

FIG. 17 illustrates portions of the video decoder 1600 that implement candidate prediction mode selection based on TM costs. Specifically, the figure illustrates the components of the inter-prediction module 1640 of the video decoder 1600. A candidate partitioning module 1710 provide candidate partitioning modes indicators to the inter-prediction module 1640. These possible candidate partitioning modes may correspond to various angle-distance pairings that defines a line that bisects the current block into two (or more) partitions according to GPM. A MV candidate identification module 1715 identifies MV candidates (as the GPM candidate list) that can be used for GPM partitions. The MV candidate identification module 1715 may identify only uni-prediction candidates or reuse merge prediction candidates from the MV buffer 1665.

For each motion vector in the GPM candidate list and/or for each candidate partitioning modes, a template identification module 1720 retrieves neighboring samples from the reconstructed picture buffer 1650 as L-shaped templates. For a candidate partitioning mode that partitions the block into two partitions, the template identification module 1720 may retrieve neighboring pixels of the current block as two current templates and use two motion vectors to retrieve two L-shaped pixel sets as two reference templates for the two partitions of the current block.

The template identification module 1720 provides the reference template(s) and the current template(s) of the currently indicated prediction mode to a TM cost calculator 1730, which performs matching to produce a TM cost for the indicated candidate partitioning mode. The TM cost calculator 1730 may combine the reference templates (with edge blending) according to GPM mode. The TM cost calculator 1730 may also compute TM costs for candidate MVs in the GPM candidate list. The TM cost calculator 1740 may also assign reordered indices to the candidate prediction modes (MVs or partitioning modes) based on the computed TM costs. TM-cost-based indices reordering is described in Section III above.

The computed TM costs are provided to a candidate selection module 1740, which may assign reordered indices to the candidate prediction modes (MV or partitioning modes) based on the computed TM costs. The candidate selection module 1740 may receive signaling of the selected prediction mode from the entropy decoder 1690, the signaling may use the TM-cost-based reordered indices (so to reduce the number bits transmitted). The selected prediction mode (MV or partitioning mode) is indicated to the motion compensation module 1630 to complete the prediction for decoding the current block. In some embodiments, the MVs provided to the motion compensation 1630 is refined (at a MV refinement module 1745) using a search process that is described in Section IV above.

Figure 18:
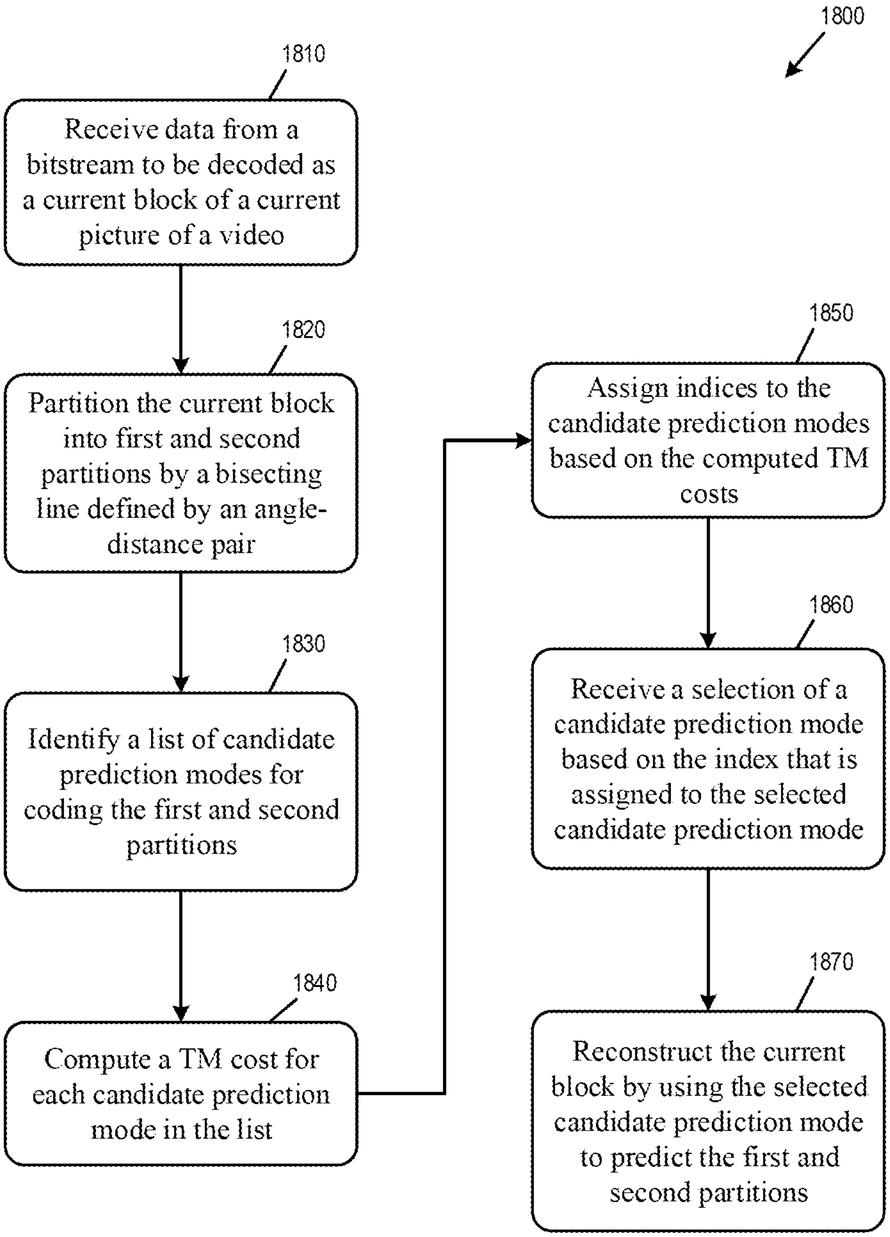
FIG. 18 conceptually illustrates a process that assigns indices to prediction candidates based on TM costs for decoding a pixel block.

FIG. 18 conceptually illustrates a process 1800 that assigns indices to prediction candidates based on TM costs for decoding a pixel block. In some embodiments, one or more processing units (e.g., a processor) of a computing device implements the decoder 1600 performs the process 1800 by executing instructions stored in a computer readable medium. In some embodiments, an electronic apparatus implementing the decoder 1600 performs the process 1800.

The decoder receives (at block 1810) data (from a bitstream) to be decoded as a current block of pixels in a current picture. The decoder partitions (at block 1820) the current block into first and second partitions by a bisecting line defined by an angle-distance pair according to geometric prediction mode (GPM). The first partition may be coded by inter-prediction that references samples in a reference picture and the second partition may be coded by intra-prediction that references neighboring samples of the current block in the current picture. Alternatively, the first and second partitions may both be coded by inter-prediction that use first and second motion vectors from the list to reference samples in first and second reference pictures.

The decoder identifies (at block 1830) a list of candidate prediction modes for coding the first and second partitions. The different candidate prediction modes in the list may correspond to different bisecting lines that are defined by different angle-distances pairings. The different candidate prediction modes in the list may also correspond to different motion vectors that may be selected to generate an inter-prediction for reconstructing the first partition or the second partition of the current block. In some embodiments, the candidate motion vectors in the list are sorted (e.g., in ascending order) according to the computed TM costs of the candidate motion vectors. In some embodiments, the list of candidate prediction modes includes only uni-prediction candidates and no bi-prediction candidates when the current block is greater than a threshold size, and merge candidates when the current block is less than a threshold size.

The decoder computes (at block 1840) a template matching (TM) cost for each candidate prediction mode in the list. The decoder may compute the TM cost of a candidate prediction mode by matching a current template of the current block with a combined template of a first reference template of the first partition and a second reference template of the second partition.

The decoder assigns (at block 1850) indices to the candidate prediction modes based the computed TM costs (e.g., lower cost candidates assigned indices that require fewer bits to signal). The decoder signals (at block 1860) a selection of a candidate prediction mode based on the index that is assigned to the selected candidate prediction mode.

The decoder reconstructs (at block 1870) the current block by using the selected candidate prediction mode, e.g., by using the selected GPM partitioning to define the first and second partitions, and/or by using the selected motion vector to predict and reconstruct the first and second partitions. The decoder may then provide the reconstructed current block for display as part of the reconstructed current picture. In some embodiments, the video decoder reconstructs the current block by using refined motion vectors to generate predictions for the first and second partitions. A refined motion vector is identified by searching for a motion vector having a lowest TM cost based on an initial motion vector.

In some embodiments, the search for the motion vector having the lowest TM cost includes iteratively applying a search pattern centered at a motion vector identified as having a lowest TM cost from a previous iteration (until a lower cost can no longer be found). In some embodiments, the decoder applies different search patterns at different resolutions (e.g., 1-pel, ½-pel, ¼-pel, etc.) in different iterations or rounds during the search process for refining the motion vector.

VII. Example Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random-access memory (RAM) chips, hard drives, erasable programmable read only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the present disclosure. In some embodiments, the software programs, when installed to operate on one or more electronic systems, define one or more specific machine implementations that execute and perform the operations of the software programs.

Figure 19:
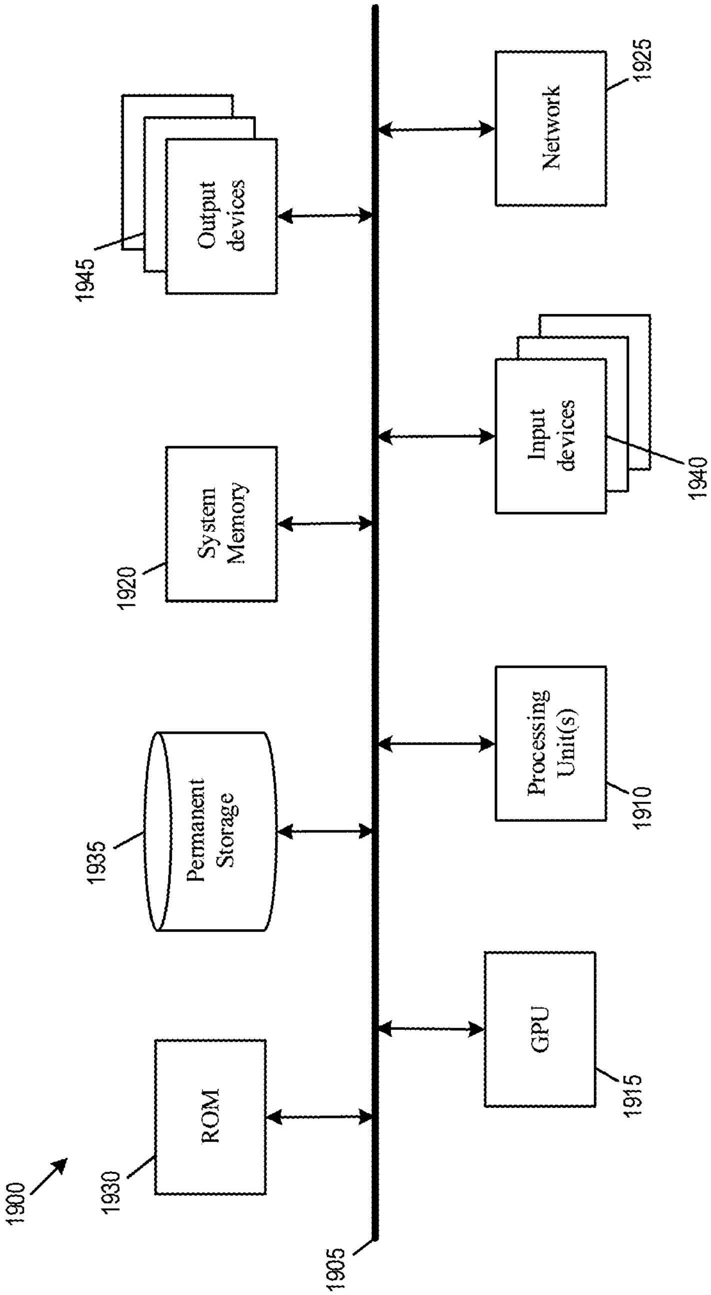
FIG. 19 conceptually illustrates an electronic system with which some embodiments of the present disclosure are implemented.

FIG. 19 conceptually illustrates an electronic system 1900 with which some embodiments of the present disclosure are implemented. The electronic system 1900 may be a computer (e.g., a desktop computer, personal computer, tablet computer, etc.), phone, PDA, or any other sort of electronic device. Such an electronic system includes various types of computer readable media and interfaces for various other types of computer readable media. Electronic system 1900 includes a bus 1905, processing unit(s) 1910, a graphics-processing unit (GPU) 1915, a system memory 1920, a network 1925, a read-only memory 1930, a permanent storage device 1935, input devices 1940, and output devices 1945.

The bus 1905 collectively represents all system, peripheral, and chipset buses that communicatively connect the numerous internal devices of the electronic system 1900. For instance, the bus 1905 communicatively connects the processing unit(s) 1910 with the GPU 1915, the read-only memory 1930, the system memory 1920, and the permanent storage device 1935.

From these various memory units, the processing unit(s) 1910 retrieves instructions to execute and data to process in order to execute the processes of the present disclosure. The processing unit(s) may be a single processor or a multi-core processor in different embodiments. Some instructions are passed to and executed by the GPU 1915. The GPU 1915 can offload various computations or complement the image processing provided by the processing unit(s) 1910.

The read-only-memory (ROM) 1930 stores static data and instructions that are used by the processing unit(s) 1910 and other modules of the electronic system. The permanent storage device 1935, on the other hand, is a read-and-write memory device. This device is a non-volatile memory unit that stores instructions and data even when the electronic system 1900 is off. Some embodiments of the present disclosure use a mass-storage device (such as a magnetic or optical disk and its corresponding disk drive) as the permanent storage device 1935.

Other embodiments use a removable storage device (such as a floppy disk, flash memory device, etc., and its corresponding disk drive) as the permanent storage device. Like the permanent storage device 1935, the system memory 1920 is a read-and-write memory device. However, unlike storage device 1935, the system memory 1920 is a volatile read-and-write memory, such a random access memory. The system memory 1920 stores some of the instructions and data that the processor uses at runtime. In some embodiments, processes in accordance with the present disclosure are stored in the system memory 1920, the permanent storage device 1935, and/or the read-only memory 1930. For example, the various memory units include instructions for processing multimedia clips in accordance with some embodiments. From these various memory units, the processing unit(s) 1910 retrieves instructions to execute and data to process in order to execute the processes of some embodiments.

The bus 1905 also connects to the input and output devices 1940 and 1945. The input devices 1940 enable the user to communicate information and select commands to the electronic system. The input devices 1940 include alphanumeric keyboards and pointing devices (also called "cursor control devices"), cameras (e.g., webcams), microphones or similar devices for receiving voice commands, etc. The output devices 1945 display images generated by the electronic system or otherwise output data. The output devices 1945 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 19, bus 1905 also couples electronic system 1900 to a network 1925 through a network adapter (not shown). In this manner, the computer can be a part of a network of computers (such as a local area network ("LAN"), a wide area network ("WAN"), or an Intranet, or a network of networks, such as the Internet. Any or all components of electronic system 1900 may be used in conjunction with the present disclosure.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, many of the above-described features and applications are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the present disclosure has been described with reference to numerous specific details, one of ordinary skill in the art will recognize that the present disclosure can be embodied in other specific forms without departing from the spirit of the present disclosure. In addition, a number of the figures (including FIG. 15 and FIG. 18) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the present disclosure is not to be limited by the foregoing illustrative details, but rather is to be defined by the appended claims.

ADDITIONAL NOTES

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A video coding method comprising:

receiving data to be encoded or decoded as a current block of a current picture of a video, wherein the current block is partitioned into first and second partitions by a bisecting line defined by an angle-distance pair;

identifying a list of candidate prediction modes for coding the first and second partitions, wherein the first partition is coded by inter-prediction that references samples in a reference picture and the second partition is to be coded by intra-prediction that references neighboring samples of the current block in the current picture;

computing a template matching (TM) cost for each candidate prediction mode in the list;

reordering the candidate prediction modes in the list based on the TM cost for each candidate prediction mode in the list;

receiving or signaling a selection of a candidate prediction mode based on an index that is assigned to the selected candidate prediction mode in the reordered list; and reconstructing the current block by using the selected candidate prediction mode to predict the first and second partitions.

2. The video coding method of claim 1, wherein the TM cost of a candidate prediction mode is computed by matching a current template of the current block with a combined template of a first reference template of the first partition and a second reference template of the second partition.

3. The video coding method of claim 1, wherein different candidate prediction modes in the list correspond to different bisecting lines that are defined by different angle-distances pairings.

4. The video coding method of claim 1, wherein different candidate prediction modes in the list correspond to different motion vectors, wherein the selected candidate prediction mode corresponds to a candidate motion vector that is selected from the list to generate an inter-prediction for reconstructing the first partition or the second partition of the current block.

5. The video coding method of claim 4, wherein the candidate motion vectors in the list are sorted according to the computed TM costs of the candidate motion vectors.

6. The video coding method of claim 1, wherein the list of candidate prediction modes comprises (i) only uni-prediction candidates and no bi-prediction candidates when the current block is greater than a threshold size and (ii) merge candidates when the current block is less than a threshold size.

7. The video coding method of claim 1, wherein the first and second partitions are coded by inter-prediction that uses first and second motion vectors from the list to reference samples in first and second reference pictures.

8. The video coding method of claim 1, wherein reconstructing the current block comprises using refined motion vectors to generate predictions for the first and second partitions, wherein a refined motion vector is identified by searching for a motion vector having a lowest TM cost based on an initial motion vector.

9. The video coding method of claim 8, wherein searching for the motion vector having the lowest TM cost comprises iteratively applying a search pattern centered at a motion vector identified as having a lowest TM cost from a previous iteration.

10. The video coding method of claim 9, wherein searching for the motion vector having the lowest TM cost comprises applying different search patterns at different resolutions in different iterations.

11. The video coding method of claim 1, wherein the list of candidate prediction modes comprises one or more merge candidates, wherein the TM cost of a merge candidate is computed by matching a current template of the current block with a reference template of a block of pixels referenced by the merge candidate.

12. The video coding method of claim 11, wherein the list of candidate prediction modes further comprises one or more geometric prediction mode (GPM) candidates, wherein the TM cost of a GPM candidate is computed by matching a current template of the current block with a combined template of a first reference template of the first partition and a second reference template of the second partition.

13. An electronic apparatus comprising:

a video decoder or encoder circuit configured to perform operations comprising:

receiving data to be encoded or decoded as a current block of a current picture of a video, wherein the current block is partitioned into first and second partitions by a bisecting line defined by an angle-distance pair;

identifying a list of candidate prediction modes for coding the first and second partitions, wherein the first partition is coded by inter-prediction that references samples in a reference picture and the second partition is to be coded by intra-prediction that references neighboring samples of the current block in the current picture;

computing a template matching (TM) cost for each candidate prediction mode in the list;

reordering the candidate prediction modes in the list based on the TM cost for each candidate prediction mode in the list;

receiving or signaling a selection of a candidate prediction mode based on an index that is assigned to the selected candidate prediction mode in the reordered list; and reconstructing the current block by using the selected candidate prediction mode to predict the first and second partitions.

* * * * *